(12) United States Patent
Oishi et al.

(10) Patent No.: US 7,673,153 B1
(45) Date of Patent: Mar. 2, 2010

(54) DATA PROCESSING METHOD, APPARATUS AND SYSTEM FOR ENCRYPTED DATA TRANSFER

(75) Inventors: Tateo Oishi, Saitama (JP); Takumi Okaue, Kanagawa (JP); Nobuyuki Kihara, Tokyo (JP); Teppei Yokota, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/524,358

(22) Filed: Mar. 14, 2000

(30) Foreign Application Priority Data

Mar. 15, 1999 (JP) .............................. 11-069152
Jun. 24, 1999 (JP) .............................. 11-178188

(51) Int. Cl.
*G06F 5/00* (2006.01)
(52) U.S. Cl. ...................... 713/193; 711/163
(58) Field of Classification Search ............. 713/193, 713/189; 711/163; 380/29
See application file for complete search history.

(56) References Cited

U.S. PATENT DOCUMENTS

| | | | | |
|---|---|---|---|---|
| 4,078,152 | A * | 3/1978 | Tuckerman, III | 380/37 |
| 5,008,935 | A * | 4/1991 | Roberts | 380/29 |
| 5,237,460 | A * | 8/1993 | Miller et al. | 360/8 |
| 5,241,599 | A * | 8/1993 | Bellovin et al. | 713/171 |
| 5,594,793 | A * | 1/1997 | Bahout | 713/193 |
| 5,615,020 | A * | 3/1997 | Keith | 382/246 |
| 5,761,302 | A * | 6/1998 | Park | 380/201 |
| 5,765,197 | A * | 6/1998 | Combs | 711/164 |
| 5,881,038 | A | 3/1999 | Oshima et al. | |
| 5,943,421 | A * | 8/1999 | Grabon | 380/269 |
| 6,157,720 | A * | 12/2000 | Yoshiura et al. | 380/44 |
| 6,202,152 | B1 * | 3/2001 | Yuenyongsgool et al. | 713/200 |
| 6,378,071 | B1 * | 4/2002 | Sasaki et al. | 713/165 |
| 6,385,727 | B1 * | 5/2002 | Cassagnol et al. | 713/193 |

FOREIGN PATENT DOCUMENTS

| | | |
|---|---|---|
| EP | 0 899 733 | 3/1999 |
| JP | EP0851627 A1 * | 9/1995 |
| WO | WO 95 16238 | 6/1995 |

OTHER PUBLICATIONS

Bruce Schneier, Applied Cryptography, 1996, pp. 270-271.*
Applied Crytography, Bruce Schneier, Second Edition.*

* cited by examiner

*Primary Examiner*—Kambiz Zand
*Assistant Examiner*—Peter Poltorak
(74) *Attorney, Agent, or Firm*—Frommer Lawrence & Haug LLP; William S. Frommer; Ellen Marcie Emas

(57) ABSTRACT

A data processing apparatus includes an encrypting apparatus for encrypting data in units of an encryption block having a predetermined data length. A processing apparatus is also provided for performing predetermined processing on data in units of a processing block having a data length of a whole multiple of the predetermined length of the encryption block. A controller is also provided for writing the encrypted data in a storage medium so that the data positioned in the same encryption block is also positioned in the same processing block. The controller also reads the data from the storage means in units of the processing block when the data is to be read out.

19 Claims, 27 Drawing Sheets

DIVISIONAL EDITING OF TRACK

Figure 2

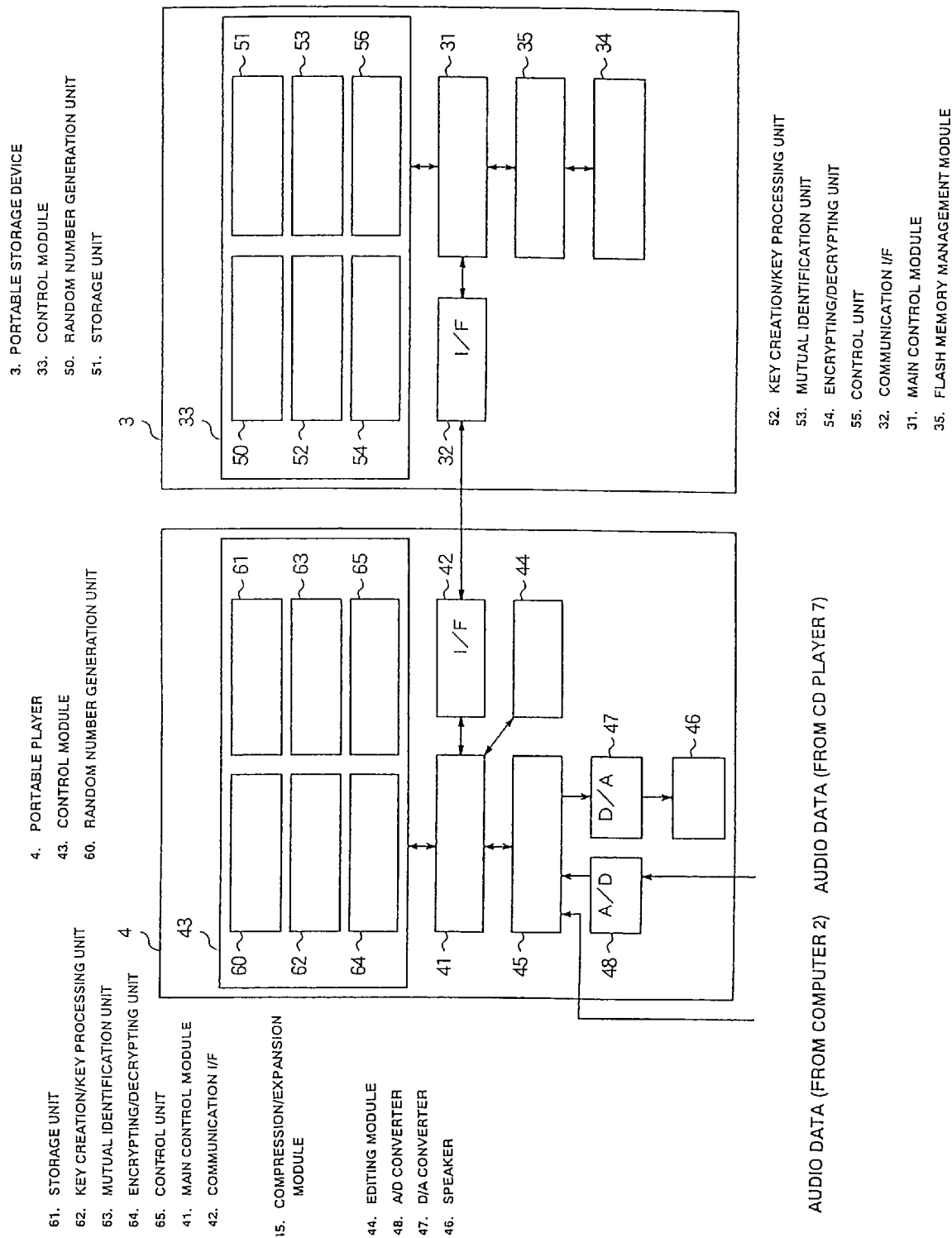

3. PORTABLE STORAGE DEVICE
33. CONTROL MODULE
50. RANDOM NUMBER GENERATION UNIT
51. STORAGE UNIT

52. KEY CREATION/KEY PROCESSING UNIT
53. MUTUAL IDENTIFICATION UNIT
54. ENCRYPTING/DECRYPTING UNIT
55. CONTROL UNIT
32. COMMUNICATION I/F
31. MAIN CONTROL MODULE
35. FLASH MEMORY MANAGEMENT MODULE

4. PORTABLE PLAYER
43. CONTROL MODULE
60. RANDOM NUMBER GENERATION UNIT

61. STORAGE UNIT
62. KEY CREATION/KEY PROCESSING UNIT
63. MUTUAL IDENTIFICATION UNIT
64. ENCRYPTING/DECRYPTING UNIT
65. CONTROL UNIT
41. MAIN CONTROL MODULE
42. COMMUNICATION I/F
15. COMPRESSION/EXPANSION MODULE
44. EDITING MODULE
48. A/D CONVERTER
47. D/A CONVERTER
46. SPEAKER

AUDIO DATA (FROM COMPUTER 2)  AUDIO DATA (FROM CD PLAYER 7)

FIG. 3

DATA STORED IN STORAGE UNIT 51 OF
PORTABLE STORAGE DEVICE 3

IDENTIFICATION KEY DATA $IK_0$
$IK_1$
$IK_2$
$IK_3$
⋮
$IK_{30}$
$IK_{31}$

DEVICE IDENTIFICATION DATA  $ID_m$

STORAGE USE KEY DATA  $SK_m$

Figure 7

REPRODUCTION MANAGEMENT FILE

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0X0000 | BLKID-TL0 | | | | Reserved | | MCode | | REVISION | | | | | Reserved | | |
| 0X0010 | SN1C+L | | SN2C+L | | SINFSIZE | | T-TRK | | VerNo | | Reserved | | | | | |
| 0X0020 | NM1-S(256) | | | | | | | | | | | | | | | |
| 0X0120 | NM2-S(512) | | | | | | | | | | | | | | | |
| 0X0320 | Reserved | | | | | | | | | | CONTENTSKEY | | | | | |
| 0X0330 | Reserved | | | | | | | | | | MAC | | | | | |
| | | | | | | | | | | | | | | S-YMDhms | | |
| 0X0350 | TRK-001 | TRK-002 | | TRK-003 | TRK-004 | | TRK-005 | | TRK-006 | | TRK-007 | | TRK-008 | | | |
| | TRK-009 | TRK-010 | | TRK-011 | TRK-012 | | TRK-013 | | TRK-014 | | TRK-015 | | TRK-016 | | | |
| | | | | | | Reserved | | | | | | | | | | |
| | TRK-393 | TRK-394 | | TRK-395 | TRK-396 | | TRK-397 | | TRK-398 | | TRK-399 | | TRK-400 | | | |
| 0X0660 | INF-S(14720) | | | | | | | | | | | | | | | |
| 0X0647 | | | | | | | | | | | | | | | | |
| 0X3FF0 | BLKID-TL0 | | | | Reserved | | MCode | | REVISION | | | | | Reserved | | |

TRKTBL: 0X0350 – 0X0647

Figure 8

| Addr | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0X0000 | BLKID-TL0 | | | | Reserved | | MCode | | REVISION | | | | Reserved | | | |
| 0X0010 | SN1C+L | | SN2C+L | | SINFSIZE | | T-TRK | | VerNo | | Reserved | | | | | |
| 0X0020 | NM1-S(256) | | | | | | | | | | | | | | | |
| 0X0120 | NM2-S(512) | | | | | | | | | | | | | | | |
| 0X0320 | Reserved | | | | | | | | CONTENTSKEY | | | | | | | |
| 0X0330 | Reserved | | | | | | | | MAC | | | | | | | |
| | | | | | | | | | S-YMDhms | | | | | | | |
| 0X0350 | TRK-001 | | TRK-002 | | TRK-003 | | TRK-004 | | TRK-005 | | TRK-006 | | TRK-007 | | TRK-008 | |
| 0X0360 | TRK-009 | | TRK-010 | | TRK-011 | | TRK-012 | | TRK-013 | | TRK-014 | | TRK-015 | | TRK-016 | |
| 0X0660 | TRK-393 | | TRK-394 | | TRK-395 | | TRK-396 | | TRK-397 | | TRK-398 | | TRK-399 | | TRK-400 | |
| 0X0670 | INF-S(14720) | | | | | | | | | | | | | | | |
| 0X3FF0 | BLKID-TL0 | | | | Reserved | | MCode | | REVISION | | | | Reserved | | | |

| Addr | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| | INF | 0x00 | ID | 0x00 | SIZE | | MCode | | C+L | | Reserved | | DATA VARIABLE LENGTH | | | |

Figure 10

A3Dnnnnn.MSA(ATRAC3 DATA FILE)

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0x0000 | BLKID-HD0 | | | | Reserved | | MCode | | Resevred | | | | BLOCK SERIAL | | | |
| 0x0010 | N1C+L | | N2C+L | | INFSIZE | | T-PRT | | T-SU | | | | INX | | XT | |
| 0x0020 | NM1(256) | | | | | | | | | | | | | | | |
| 0x0120 | NM2(512) | | | | | | | | | | | | | | | |
| 0x0310 | | | | | | | | | | | | | | | | |
| 0x0320 | Reserved(8) | | | | | | | | CONTENTSKEY | | | | | | | |
| | Reserved(8) | | | | | | | | MAC | | | | | | | |
| | Reserved(12) | | | | | | | | | | | | A | LT | FNo | |
| | MG(D)SERIAL-nnn | | | | | | | | | | | | | | | |
| 0x0360 | CONNUM | | | | YMDhms-S | | | | YMDhms-E | | | | MT | CT | CC | CN |
| 0x0370 | PRTSIZE | | | | PRTKEY | | | | | | | | Reserved(8) | | | |
| 0x0380 | | | | | CONNUM0 | | | | PRTSIZE(0x0388) | | | | PRTKEY | | | |
| 0x0390 | | | | | Reserved(8) | | | | | | | | CONNUM0 | | | |
| | INF(0x0400) | | | | | | | | | | | | | | | |
| 0x3FFF | BLKID-HD0 | | | | Reserved | | MCode | | Resevred | | | | BLOCK SERIAL | | | |
| 0x4000 | BLKID-A3D | | | | Reserved | | MCode | | CONNUM0 | | | | BLOCK SERIAL | | | |
| 0x4010 | BLOCK SEED | | | | | | | | INITILIZATION VECTOR | | | | | | | |
| 0x4020 | SU-000(Nbyte=384byte) | | | | | | | | | | | | | | | |
| 0x41A0 | SU-001(Nbyte) | | | | | | | | | | | | | | | |
| 0x4320 | SU-002(Nbyte) | | | | | | | | | | | | | | | |
| 0x04A0 | SU-041(Nbyte) | | | | | | | | | | | | | | | |
| 0x7DA0 | | | | | | | | | | | | | | | | |
| 0x7F20 | Reserved(Nbyte=208byte) | | | | | | | | | | | | | | | |
| | BLOCK SEED | | | | | | | | | | | | | | | |
| 0x7FF0 | BLKID-A3D | | | | Reserved | | MCode | | CONNUM0 | | | | BLOCK SERIAL | | | |

Figure 11

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0x0000 | BLKID-HD0 ||| Reserved || MCode || Reseved |||| BLOCK SERIAL ||||
| 0x0010 | N1C+L || N2C+L || INFSIZE || T-PRT || T-SU |||| INX || XT ||
| 0x0020 | NM1(256) |||||||||||||||| 
| 0x0120 | NM2(512) |||||||||||||||| 
| 0x0310 | ||||||||||||||||

Figure 12

| | | | | | | | | | | | | | | | | |
|---|---|---|---|---|---|---|---|---|---|---|---|---|---|---|---|---|
| 0x0320 | Reserved(8) |||||||| CONTENTSKEY ||||||||
| | Reserved(8) |||||||| MAC ||||||||
| | Reserved(12) |||||||||||||| A | LT | FNo |
| | MG(D)SERIAL-nnn ||||||||||||||||
| 0x0360 | CONNUM |||| YMDhms-S |||||| YMDhms-E |||| MT | CT | CC | CN |

Figure 13 bit7:MODE OF ATRAC3   0:Dual   1:Joint bit6,5,4   N OF 3 BITS:MODE VALUE

| N | MODE | TIME | TRANSMISSION RATE | SU | BYTES |
|---|---|---|---|---|---|
| 7 | HQ | 47min | 176kbps | 31SU | 512 |
| 6 |  | 58min | 146kbps | 38SU | 424 |
| 5 | EX | 64min | 132kbps | 42SU | 384 |
| 4 | SP | 81min | 105kbps | 53SU | 304 |
| 3 |  | 90min | 94kbps | 59SU | 272 |
| 2 | LP | 128min | 66kbps | 84SU | 192 |
| 1 | mono | 181min | 47kbps | 119SU | 136 |
| 0 | mono | 258min | 33kbps | 169SU | 96 | bit3:Reserved bit2:DATA TYPE　　　0:AUDIO　　　1:OTHER bit1:REPRODUCTION SKIP   0:NORMAL REP   1:SKIP bit0:EMPHASIS　　　0:OFF　　　　1:ON(50/15 $\mu$ S)

Figure 14

```
    bit7      :COPY PERMISSION      0:COPY PROHIBITION      1:COPY PERMISSION
    bit6      :GENERATION      0:ORIGINAL      1:FIRST OR LATER COPY GENERATION
HCMS bit5-4   :COPY CONTROL FOR HIGH SPEED DIGITAL COPY
              00:COPY PROHIBITION  01:COPY FIRST GENERATION 10:COPY PERMISSION
              COPY OF FIRST COPY GENERATION IS PROHIBITED.
    bit3-2    MagicGate AUTHENTICATION LEVEL
              00:Level10(Non-MG)      01:Level1
              10:Level2               11:Reserved
              DIVIDE AND COMBINE ARE PROHIBITED IN OTHER THAN LEVEL 10.
    bit1,0    Reserved
```

Figure 15

| | | | |
|---|---|---|---|
| 0x0370 | PRTSIZE | PRTKEY | Reserved(8) |
| 0x0380 | | CONNUM0 | PRTSIZE(0x0388) | PRTKEY |
| 0x0390 | Reserved(8) | | CONNUM0 |

Figure 16

| | | | | | |
|---|---|---|---|---|---|
| 0x4000 | BLKID-A3D | Reserved | MCode | CONNUM0 | BLOCK SERIAL |
| 0x4010 | BLOCK SEED | | | INITIALIZATION VECTOR | |
| 0x4020 | SU-000(Nbyte=384byte) | | | | |

FIG. 17

DATA TO BE STORED IN STORAGE UNIT 61 OF PORTABLE PLAYER 4

MASTER KEY DATA
- $MK_0$
- $MK_1$
- $MK_2$
- $MK_3$
- ⋮
- $IK_{30}$
- $IK_{31}$

DEVICE IDENTIFICATION DATA   $ID_d$

WRITE PROCESSING TO PORTABLE STORAGE DEVICE 3

PROCESSING FOR READING FROM PORTABLE STORAGE DEVICE 3

Figure 28

Cluster CL(2) of Track(1) after divide

| | 0 1 2 3 | 4 5 | 6 7 | 8 9 A B | C D E F |
|---|---|---|---|---|---|
| Address ↓ | BLKID-A3D | Reserved | MCode | CONNUM0 | BLOCK SERIAL |
| | BLOCK SEED | | | INITIALIZATION VECTOR (last 8 bytes of last SU of CL(1)) | |
| | SU(0) | | | | |
| | SU(1) | | | | |
| | SU(2) | | | | |
| | SU(3) | | | | |
| | BLOCK SEED | | | | |
| | BLKID-A3D | Reserved | MCode | CONNUM0 | BLOCK SERIAL |

Figure 29

Cluster CL(0) of Track(2) after divide

| | 0 1 2 3 | 4 5 | 6 7 | 8 9 A B | C D E F |
|---|---|---|---|---|---|
| Address ↓ | BLKID-A3D | Reserved | MCode | CONNUM0 | BLOCK SERIAL |
| | BLOCK SEED | | | INITIALIZATION VECTOR (last 8 bytes of last SU(3) of CL(2) of track(1)) | |
| | SU(0) (SU(4) of CL(2) of original track(1)) | | | | |
| | SU(1) (SU(5) of CL(2) of original track(1)) | | | | |
| | BLOCK SEED | | | | |
| | BLKID-A3D | Reserved | MCode | CONNUM0 | BLOCK SERIAL |

DATA PROCESSING METHOD, APPARATUS AND SYSTEM FOR ENCRYPTED DATA TRANSFER

BACKGROUND OF THE INVENTION

1. Field of the Invention

The present invention relates to a data processing method and apparatus for encrypting and decrypting digital data comprised of one or more related modules (e.g., an audio track comprising a sequence of songs) for transfer to and from a data processing apparatus and a storage device.

2. Description of the Related Art

In order to prevent illicit use, data files that contain copyrighted material can be encrypted prior to storage. For example, it is sometimes necessary for storage and/or editing to divide an audio track corresponding to a sequence of songs into related data modules (or parts) whose smaller size is more conducive to various storage mediums. Because the various parts of a track may not be stored sequentially, each track must contain information defining the parts of which it is comprised. Otherwise, parts may become lost during transfers or editing. Therefore, any changes to the parts must be recognized at the track level. In addition, each part is comprised of a sequence of data blocks (clusters). Such audio tracks are often encrypted to prevent unauthorized use and copying of the music.

In order to make unauthorized use of the data more difficult the encryption process assigns a content key to each track and a part key to each part (module). The content keys and part keys are then processed into block keys for encrypting the data at the block level.

When data encrypted in this manner is edited, encrypted parts may end up belonging to a new track that was encrypted with different block keys. Because the block keys depend on the track keys and part keys, any changes in the content of a track requires the data be first decrypted using the old track and part keys, then re-encrypted with the new track and part keys. Otherwise, tracks encrypted with a mix of keys will result and parts could become lost. This would make subsequent use of the data impossible.

This requirement that the previously encrypted track data be decrypted and then re-encrypted whenever editing is performed creates a tremendous processing burden. Currently, this burden results in processing times that make such encryption impractical.

OBJECTS OF THE INVENTION

It is an object of the present invention to alleviate the related art's above discussed processing problem by providing a data processing method and apparatus capable of shortening the processing time required when editing or the like is performed.

Another object of the invention is to provide an improved method, apparatus and system for recording and reproducing encrypted data in which data is encrypted in units of an encryption block of a predetermined data length and predetermined processing is performed on the encrypted data in units of a processing block having a data length of a whole multiple of the encryption block.

A further object of the invention is to provide an improved method, apparatus and system for recording and reproducing encrypted data in which data is encrypted in units of an encryption block of a predetermined data length and predetermined processing is performed on the encrypted data in units of a processing block having a data length of a whole multiple of the encryption block, and wherein the encrypted data is written in a storage medium so that all data positioned in the same encryption block is also positioned in the same processing block.

Still other objects and advantages of the invention will in part be obvious and will in part be apparent from the specification and the drawings.

SUMMARY OF THE INVENTION

In accordance with the invention, a data processing apparatus is provided comprising an encrypting apparatus for encrypting data in units of an encryption block of a predetermined data length and a processing apparatus for performing predetermined processing on data in units of a processing block having a data length of a whole multiple of the encryption block. A storage medium for storing the encrypted data and a control apparatus for writing the encrypted data to the storage medium are provided. Thus, data positioned in the same encryption block is also positioned in the same processing block. Data read from the storage medium during processing is read in units of the processing block, and therefore also reads complete encryption blocks.

Further, in the data processing apparatus of the invention, the control apparatus preferably inserts data to adjust the data length of the processing block so that the data length of the processing block becomes a whole multiple of the data length of an encryption block.

Further, in the data processing apparatus of the invention, the encrypting apparatus preferably performs encryption processing using the encryption block to be encrypted and a cipher text obtained from the encryption of the encryption block immediately before the encryption block to be encrypted.

Further, in the data processing apparatus of the invention, the control apparatus preferably manages the encrypted data stored in the storage means in accordance with a data storage cluster containing one or more processing blocks and initial values used when encrypting an encryption block encrypted in a processing block.

Further, in the data processing apparatus of the invention, the control means preferably stores one or more processing blocks at consecutive addresses of the storage medium in the order of encryption, stores one or more encryption blocks in the processing blocks at consecutive addresses of the storage medium in the order of encryption, and stores the initial values at an address immediately before the address of the storage medium at which the encryption block first encrypted in the processing block of the cluster is stored.

Further, the data processing system of the invention comprises a data processing system for inputting and outputting data while performing mutual identification between a storage apparatus and a data processing apparatus. The storage apparatus comprises a first mutual identification processing apparatus for performing processing for mutual identification with the data processing apparatus. A storage medium for storing the data, and a first control apparatus for allowing the input and output of data between the data processing apparatus and the storage medium when the data processing apparatus is recognized to be a legitimate party by the processing for mutual identification are also provided. The data processing system further comprises a second mutual identification processing apparatus for performing processing for mutual identification with the storage medium. An encrypting apparatus for encrypting data in units of an encryption block of a predetermined data length and a processing apparatus for performing predetermined processing on data in units of a processing block having a data length of a whole multiple of the encryption block are also provided. A second control apparatus for performing at least one of write processing and read processing when the data processing apparatus is recognized to be a legitimate party by the processing for mutual identification, writing the encrypted data in the storage medium so that data positioned in one encryption block is also positioned in the same processing block during write processing, and reading the data from the storage medium in units of the processing block during read processing.

Further, the data processing method of the invention comprises encrypting data in units of an encryption block of a predetermined data length and performing predetermined processing on data in units of a processing block having a data length of a whole multiple of the encryption block. The encrypted data is written in a storage medium so that all data positioned in the same encryption block is also positioned in the same processing block. The method thus allows for reading the data from the storage medium in units of a processing block and therefore also in units that is a multiple of encryption blocks.

The invention accordingly comprises the several steps and the relation of one or more of such steps with respect to each of the others, and the apparatus embodying features of construction, combinations of elements and arrangement of parts that are adapted to effect such steps, all as exemplified in the following detailed disclosure, and the scope of the invention will be indicated in the claims.

BRIEF DESCRIPTION OF THE DRAWINGS

For a more complete understanding of the invention, reference is made to the following description and accompanying drawings, in which:

FIG. 2 depicts the internal structure of the portable storage device and portable player shown in FIG. 1;

FIG. 3 depicts data stored in a storage unit of the portable storage device shown in FIG. 2;

FIG. 7 depicts the overall data structure of a reproduction management file PBLIST;

FIG. 8 depicts the detailed data structure of the reproduction management file PBLIST including: a header portion, a main data portion, and an additional information data portion;

FIG. 10 depicts the detailed data structure of an ATRAC3 data file;

FIG. 11 depicts the data structure of an upper portion of the attribute header of an ATRAC3 data file;

FIG. 12 depicts the data structure of a middle portion of the attribute header of an ATRAC3 data file;

FIG. 13 is a correlation table for correlating record modes, record time, and other information;

FIG. 14 is a table showing copy control states;

FIG. 15 depicts the data structure of a lower portion of the attribute header of an ATRAC3 data file;

FIG. 16 depicts the data structure of a header of a data block of an ATRAC3 data file;

FIG. 17 depicts the data stored in the storage unit of the portable player shown in FIG. 2;

FIG. 28 depicts the data in the cluster CL(2) of track(1) after the divisional editing shown in FIG. 27;

FIG. 29 depicts the data in the cluster CL(0) of track(2) after the divisional editing shown in FIG. 27;

DETAILED DESCRIPTION OF THE PREFERRED EMBODIMENTS

Figure 1:
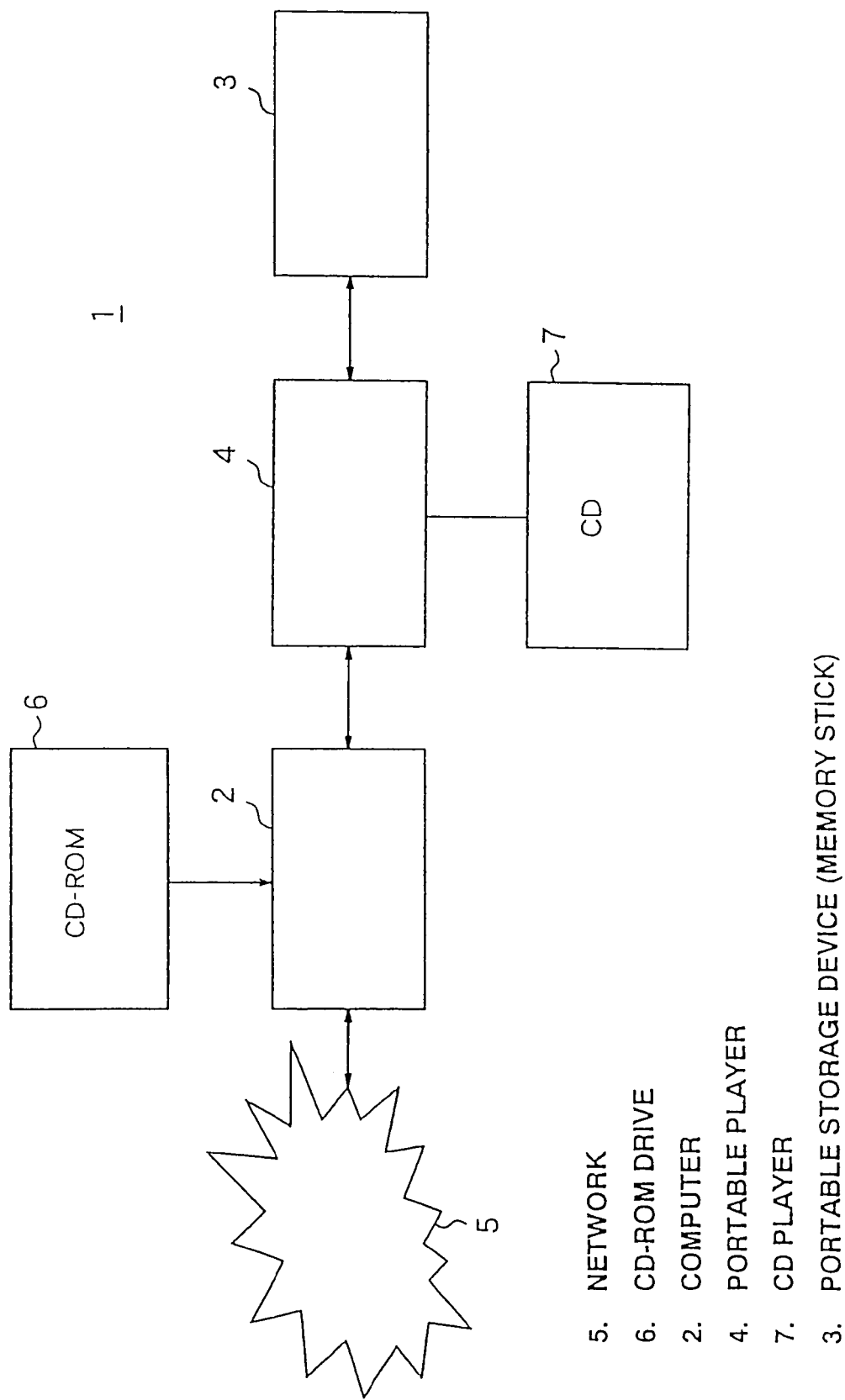
FIG. 1 illustrates the overall system configuration of the audio system constructed in accordance with the present invention.

FIG. 1 is a view of the system configuration of an audio system 1 constructed in accordance with the present invention. The audio system 1 has for example a computer 2, a portable storage device 3, a portable player 4, a CD-ROM drive 6, and a CD player 7. Audio system 1 corresponds to the data processing system of the present invention, portable storage device 3 corresponds to the storage device of the present invention, and portable player 4 corresponds to the data processing apparatus of the present invention.

In the present embodiment, the first key data of the present invention corresponds to the content key data CK, the second key data corresponds to the part key data PK, the third key data corresponds to the temporary key data TMK, the fourth key data corresponds to the block seed data BS, and the fifth key data corresponds to the block key data.

FIG. 2 is a view of the internal configuration of portable storage device 3 and portable player 4 shown in FIG. 1. In the present embodiment, the module use key data calculating means of the present invention corresponds to a key creation/key processing unit 62 shown in FIG. 2, the encrypting means corresponds to an encrypting/decrypting unit 64, and the key data processing means corresponds to an editing module 44.

Computer 2

Computer 2 is connected to a network 5, receives audio data (track data) from a host computer (not shown) of a service provider who provides EMD (Electronic Music Distribution) or other services via network 5, decrypts the received audio data according to need, and outputs the same to portable player 4. Computer 2 exchanges identification, charging, and other necessary information with the host computer of the service provider when receiving content data. Computer 2 can also transfer audio data input from CD-ROM drive 6 to portable player 4.

Portable Storage Device 3

As is further shown in FIG. 2, portable storage device 3 houses a built in rewritable semiconductor memory such as a flash memory 34, commercially available from Sony Corporation under the trademark Memory Stick. Portable storage device 3 also has a main control module 31, a communication interface 32, a control module 33, and a flash memory management module 35.

Control Module 33

Control module 33 is a single chip integrated circuit with a multi-layer structure used exclusively for encryption. Internal memory cells are sandwiched by dummy layers such as aluminum layers. Further, control module 33 has a narrow range of operating voltage or operating frequency and is tamper resistant so that any stored data cannot be illicitly read from the outside.

As shown in FIG. 2, control module 33 contains a random number generation unit 50, a storage unit 51, a key creation/processing unit 52, a mutual identification unit 53, an encrypting/decrypting unit 54, and a control unit 55. Random number generation unit 50 generates a 64 bit (8-byte) random number upon receiving a random number generation instruction. Storage unit 51 may include an EEPROM (electrically erasable programmable read only memory) or other nonvolatile memory and stores key data and other various data required for identification.

FIG. 3 depicts the data stored in storage unit 51. This stored data includes identification key data $IK_0$ to $IK_{31}$, device identification data $ID_m$ and storage use key data Skm.

The identification key data $IK_0$ to $IK_{31}$ are key data used when portable storage device 3 performs a mutual identification process with portable player 4. One identification key from among the identification key data $IK_0$ to $IK_{31}$ is selected at random whenever the mutual identification process is performed. Note that the identification key data $IK_0$ to $IK_{31}$ and the storage use key data Skm cannot be read from outside of portable storage device 3. The device identification data $ID_m$ is identification data uniquely attached to each portable storage device 3 and is read out when portable storage device 3 performs the mutual identification process with portable player 4. The storage use key data Skm is used when encrypting the content key data CK and storing the same in flash memory 34 as will be mentioned later.

Key creation/processing unit 52 creates the key data by performing a MAC (message authentication code) operation and/or other various operations as defined by the ISO/IEC9797 standard. Currently, the MAC operation uses a "block cipher algorithm" defined in FIPSPUB46-2 as the DES (data encryption standard). The MAC operation is a one-way Hash function in which data having an arbitrary length is compressed to a fixed length, and a function value is determined by a secret key.

Mutual identification unit 53 performs the mutual identification process with portable player 4 before receiving audio data from portable player 4 and writing the same into flash memory 34. Mutual identification unit 53 performs the mutual identification process with portable player 4 before reading audio data from flash memory 34 and outputting the same to portable player 4. Mutual identification unit 53 also performs a MAC operation as part of the mutual identification process. The data stored in storage unit 51 is used for performing the mutual identification process.

Encrypting/decrypting unit 54 performs the encryption and decryption using one of the DES, IDEA, MISTY, or other block cipher algorithms. The mode used is an ECB (electronic code book) mode and a CBC (cipher block chaining) mode as prescribed in FIPS PUB81 "DES MODES OF OPERATION". In block encryption/decryption in accordance with the ECB and CBC modes, the designated data is encrypted/decrypted by using designated key data. Control unit 55 centrally controls processing by random number generation unit 50, storage unit 51, key creation/processing unit 52, mutual identification unit 53, and encrypting/decrypting unit 54.

Flash Memory 34

Once portable player 4 is recognized as a legitimate party by the mutual identification unit 53, the audio data input from player 4 is written into flash memory 34. Conversely, the audio data can be output from flash memory 34 to portable player 4 once portable player 4 is recognized as a legitimate party by mutual identification unit 53. Flash memory 34 has a storage capacity of 32 Mbytes.

Figure 4:
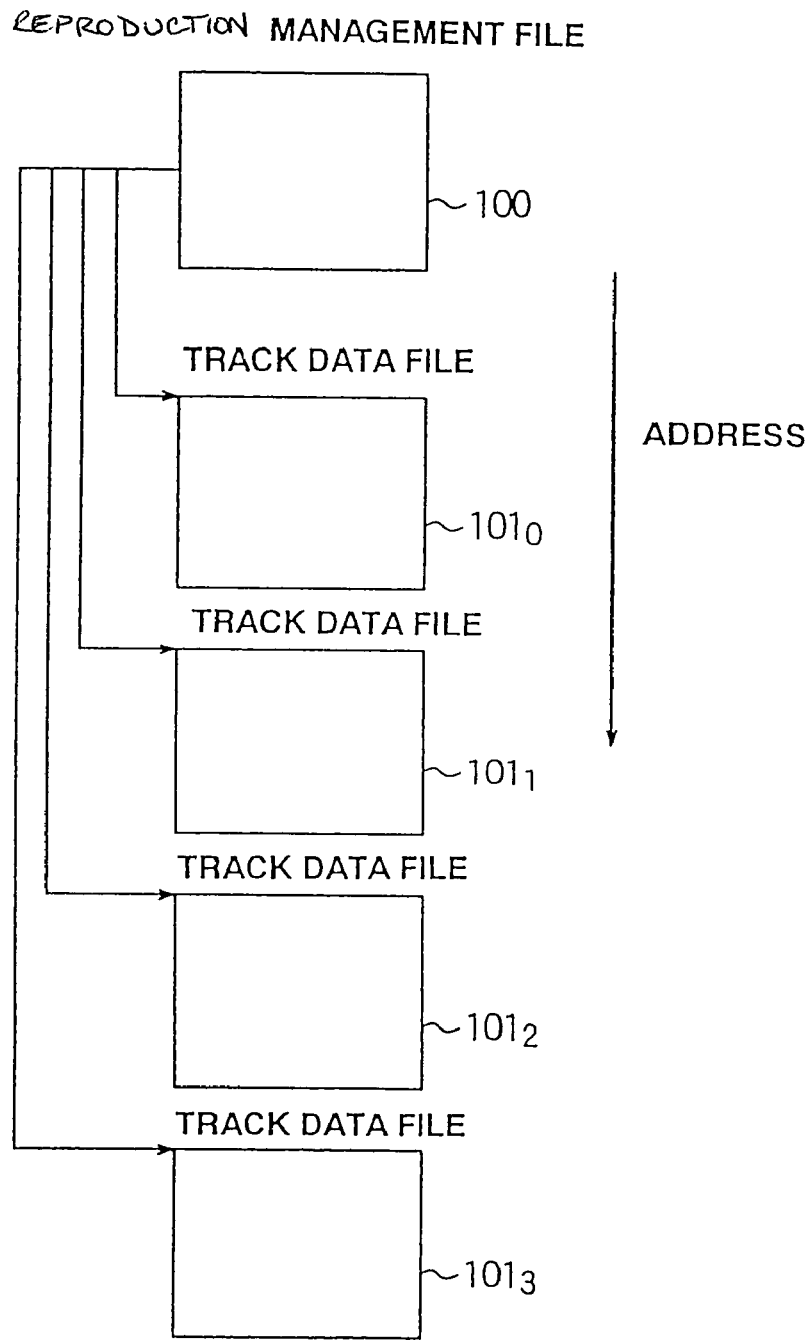
FIG. 4 depicts data stored in a flash memory of the portable device shown in FIG. 2.

As shown in FIG. 4, flash memory 34 stores a reproduction management file 100, followed by a series of track data files $101_0$, $101_1$, $101_2$, and $101_3$. Reproduction management file 100 contains data for managing reproduction of track data files $101_0$ to $101_3$. Track data files $101_1$, to $101_3$ contain the actual track data (audio data). In the present embodiment, track data is used to mean one song's worth of audio data.

Figure 5:
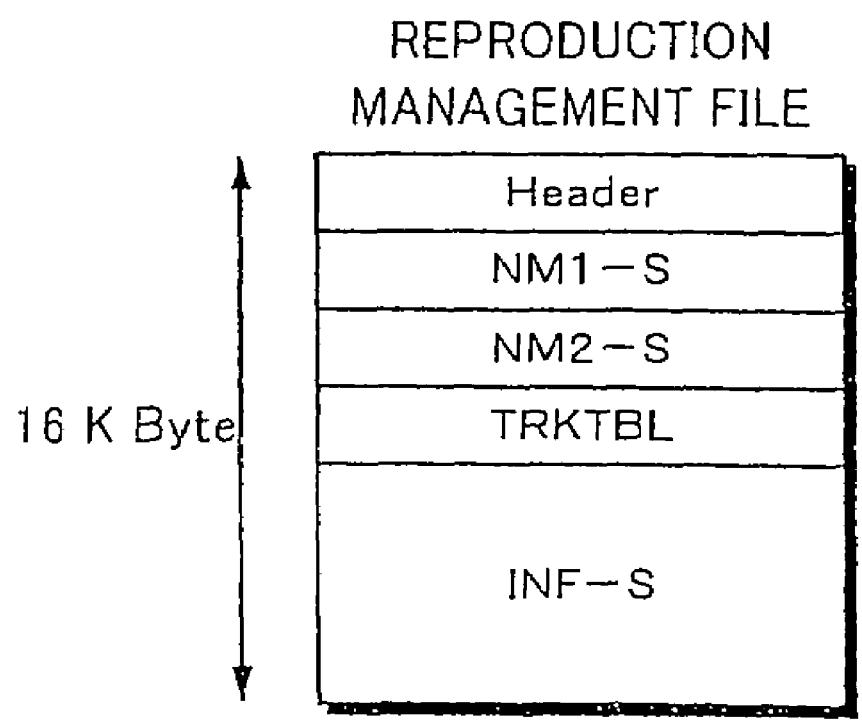
FIG. 5 depicts a data structure of a reproduction management file PBLIST.MSF that is a sub directory stored in the portable storage device shown in FIG. 2.
Figure 6:
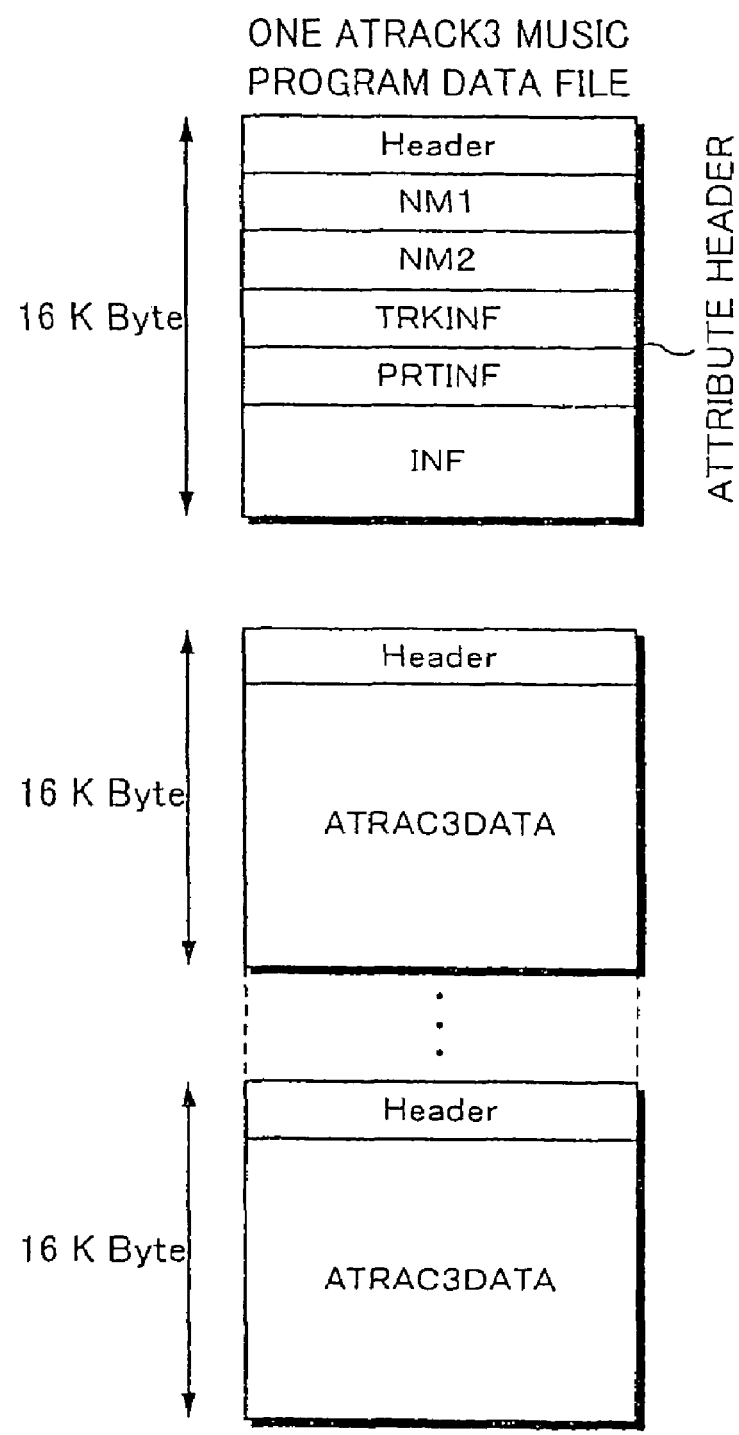
FIG. 6 depicts the data structure of an ATRAC3 data file divided into blocks of a predetermined unit length, and including an attribute header.

FIGS. 5 and 6 show how a reproduction management file is used in implementing a sample file format. ATRAC3 (Adaptive Transform Acoustic Coding) is a highly efficient encoding format for audio data. FIG. 5 shows the structure of a reproduction management file. FIG. 6 shows the file structure of an ATRAC3 data file. An ATRAC3 data file is composed of an attribute header and an encrypted music data area for each music program. Both the reproduction management file and the ATRAC3 attribute header have a fixed file length of 16 KB (one block).

The reproduction management file shown in FIG. 5 is composed of a header, a memory card name NM-1S (for one byte code), a memory card name NM2-S (for two byte code), a program reproduction sequence table TRKTBL, and an additional information area INF-S. The attribute header (shown in FIG. 6) at the beginning of the data file is composed of a header, a program name NM1 (for one byte code), a program name NM2 (for two byte code), track information TRKINF (such as track key information), part information PRTINF, and an additional track information area INF. The header contains information on the total number of parts, the track name, the size of the additional information area, and so forth.

The attribute header is followed by ATRAC3 music data. The music data is block-segmented every 16 KB, each block starting with a header. The header contains an initial value for decrypting encrypted data. Only the music data of an ATRAC3 data file is encrypted. Thus, the reproduction management file, the header, and so forth are not encrypted.

FIG. 7 is a schematic diagram showing the detailed data structure of a reproduction management file. FIG. 8 shows a header portion and the remaining portion of the reproduction management file of FIG. 7. The reproduction management file contains a 32 byte header, a name NM1-S area (256 bytes) (for the memory card), a name NM2-S area (512 bytes), a contents key area, a MAC area, an S-YMDhms area, a reproduction sequence management table TRKTBL area (800 bytes), a memory card additional information INF-S area (14720 bytes), and a redundant header information area. The start positions for each of these areas within the reproduction management file are predefined.

As shown in FIG. 8, the first 32 bytes of (0x0000) to (0x0010) are used for the header. Within the file, 16-byte areas are referred to as slots. The header is placed in the first and second slots indicated at 0x000 and 0x0010. The area denoted as "Reserved" is an undefined area. Normally, a null (0x00) is written in reserved areas. However, even if data is written to a reserved area, the data is ignored. The reserved areas are intended for use in future revisions of the file format. Option areas, when not used, are treated as reserved areas. Additionally, the reproduction management file header contains the following defined areas:

=BLKID-TL0 (4 bytes)
Meaning: BLOCKID FILE ID
Function: Identifies the top of the reproduction management file.
Value: Fixed value="TL=0" (for example, 0x544C2D30)
=MCode (2 bytes)
Meaning: MAKER CODE
Function: Identifies the maker and model of the recorder/player
Value: High-order 10 bits (Maker code); low-order 6 bits (model code).
=REVISION (4 bytes)
Meaning: Number of rewrite times of PBLIST
Function: Increments whenever the reproduction management file is rewritten.
Value: Starts at 0 and increments by 1.
=SY1C+L (2 bytes)
Meaning: Attribute of name (one byte code) of memory card written in NM1-S area.
Function: Represents the character code and the language code as one byte code.
Value: Character code (C): High-order one byte
 00: Non-character code, binary number
 01: ASCII (American Standard Code for Information Interchange)
 02: ASCII+KANA
 03: Modified 8859-1
 81: MS-JIS
 82: KS C 5601-1989
 83: GB (Great Britain) 2312-80
 90: S-JIS (Japanese Industrial Standards) (for Voice)
Language code (L): Low-order one byte identifies the language based on EBU Tech 3258 standard.
 00: Not set
 08: German
 09: English
 0A: Spanish
 0F: French
 15: Italian
 1D: Dutch
 65: Korean
 69: Japanese
 75: Chinese
When data is not recorded, this area is all 0.
=SN2C+L (2 bytes)
Meaning: Attribute of name of memory card in NM2-S area.
Function: Represents the character code and the language coded as one byte code.
Value: Same as SN1C+L
=SINFSIZE (2 bytes)
Meaning: Total size of additional information of memory card in INF-S area.
Function: Represents the data size as an increment of 16 bytes. When data is not recorded, this area is all 0.
Value: Size: 0x0001 to 0x39C (924)
=T-TRK (2 bytes)
Meaning: TOTAL TRACK NUMBER
Function: Represents the number of total tracks.
Value: 1 to 0x0190 (Max. 400 tracks)
When data is recorded, this area is all 0.
=VerNo (2 bytes)
Meaning: Format version number
Function: Represents the major version number (high order one byte) and the minor version number (low order one byte).
Value: 0x0100 (Ver 1.0)
 0x0203 (Ver 2.3)
Next, areas preceded by the header are described.
=NM1-S
Meaning: Name of memory card (as one byte code)
Function: Represents the name of the memory card as one byte code (max. 256). At the end of this area, an end code (0x00) is written. The size is calculated from the end code. When data is not recorded, null (0x00) is recorded from the beginning (0x0020) of this area for at least one byte.
Value: Various character code
=NM2-S
Meaning: Name of memory card (as two byte code)
Function: Represents the name of the memory card as two byte code (max. 512). At the end of this area, an end code (0x00) is written. The size is calculated from the end code. When data is not recorded, null (0x00) is recorded from the beginning (0x0120) of this area for at least two bytes.
Value: Various character code
=CONTENTS KEY
Meaning: Value for music program. Protected with MG(M) and stored. Same as CONTENTS KEY.
Function: Used as a key necessary for calculating MAC of S-YMDhms.
Value: 0 to 0xFFFFFFFFFFFFFFFF
=MAC
Meaning: Forged copyright information check value
Function: Represents the value generated with S-YMDhms and CONTENTS KEY.
Value: 0 to 0xFFFFFFFFFFFFFFFF
=S-YMDhms (4 bytes) (optional)
Meaning: Year, month, day, hour, minute, and second recorded by the recorder/player with a reliable clock.
Function: Identifies the last recorded date and time. In this case of EMD, this area is mandatory.
Value: bits 25 to 31: Year 0 to 99 (1980 to 2079)
 bits 21 to 24: Month 0 to 12
 bits 16 to 24: Day 0 to 31
 bits 11 to 15: Hour 0 to 23
 bits 05 to 10: Minute 0 to 59
 bits 00 to 04: Second 0 to 29 (two second interval)
=TRK-nnn Meaning: SQN (sequence) number of ATRAC3 data file reproduced.
Function: Represents FN0 of TRKINF.
Value: 1 to 400 (0x190)
When there is no track, this area is all 0.
=INF-S
Meaning: Additional information of memory card (for example, information with respect to photos, songs, guides, etc.)
Function: Represents variable length additional information with a header. A plurality of types of additional information may be used. Each of the types of additional information has an ID and a data size. Each additional information area including a header is composed of at least 16 bytes and a multiple of 4 bytes. For details, see the following section.
Value: Refer to the section of "Data Structure of Additional Information".

In the last slot of the reproduction management file, copies of BLKID-TL0, MCode, and REVISION from the header are redundantly written.

If a memory card is accidentally detached or the power of the recorder/player turned off while data is being recorded into the card, a termination error should be detected. As described above, a REVISION area is placed at the beginning and end of each block. Whenever data is rewritten, the value of the REVISION area is incremented. If a termination error occurs in the middle of writing a block, the value of the REVISION area at the beginning of the block will not match the value of the REVISION area at the end of the block. This discrepancy between the two REVISION areas allows termination errors to be determined with a high probability. When such an abnormal termination is detected; an alarm, such as an error message, is generated.

In addition, because the fixed value BLKID-TL0 is written at the beginning of one block (16 KB) the fixed value can be used as a reference for recovering data. In other words, the fixed value allows the type of the file to be determined. Because the fixed value BLKID-TL0 is redundantly written in the header and at the end of each block, reliability is secured. Alternatively, the entire reproduction management file can be redundantly recorded.

Because the amount of data in an ATRAC3 data file is much larger than in a track information management file, ATRAC3 data files are not redundantly recorded. Instead COONUM0 and BLOCK SERIAL values are used to help recover lost ATRAC3 data (as will be described below). In addition, one ATRAC3 data file may be composed of a plurality of blocks that are dispersed. To identify blocks of the same file, CON-NUM0 is used and to identify the order of the blocks BLOCK SERIAL is used. Likewise, as noted above, a maker code (MCode) is redundantly recorded at the beginning and the end of each block, so as to identify the maker of a file which has been improperly recorded.

FIG. 8 also shows the structure of an additional information area. The additional information area is composed of a header comprised of the following data, and additional variable length data:
=INF
Meaning: FIELD ID
Function: Represents the beginning of the additional information (fixed value).
Value: 0x69
=ID
Meaning: Additional information key code
Function: Represents the category of the additional information.
Value: 0 to 0xFF
=SIZE
Meaning: Size of individual additional information
Function: Represents the size of each type of additional information. Although the data size is not limited, it should be at least 16 bytes and a multiple of 4 bytes. The rest of the data should be filled with null (0x00).
Value: 16 to 14784 (0x39C0)
=MCode
Meaning: MAKER CODE
Function: Identifies the maker and model of the recorder/player.
Value: High-order 10 bits (maker code), low-order 10 bits (machine code).
=C+L
Meaning: Attribute of characters in data area starting from byte 12.
Function: Represents the character code and the language code as one byte code.
Value: Same as SNC+L
=DATA
Meaning: Individual additional information
Function: Represents each type of additional information with variable length data. Real data always starts from byte 12. The length (size) of the real data should be at least 4 bytes and a multiple of 4 bytes. The rest of the data area should be filled with null (0x00).
Value: Individually defined corresponding to the contents of each type of additional information.

Figure 9:
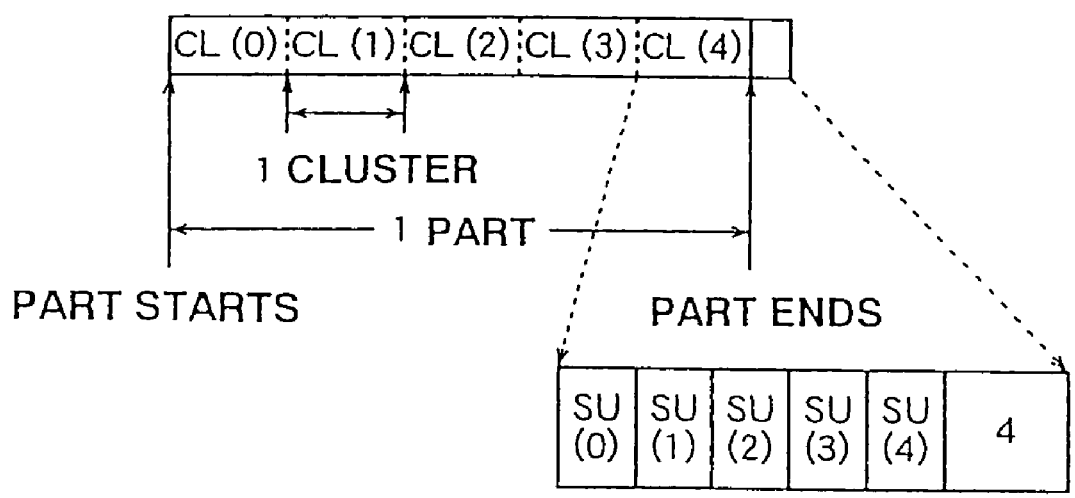
FIG. 9 depicts the structure of the data stored in the storage unit of the portable player shown in FIG. 2.

Next, an explanation is made of track data files $101_0$ to $101_3$, as shown in FIG. 9. Track data file $101_0$ comprises one part that includes five clusters CL(O), CL(1), CL(2), CL(3), and CL(4). The part comprising track data file $101_0$ starts at the head of cluster CL(O) and ends at a sound unit SU(4) of cluster CL(4).

Note that each of the track data files $101_1$ to $101_3$ has basically the same configuration shown in FIG. 9, but the number of parts, the number of clusters, and the a number of sound units SU contained in the cluster are independently determined and may vary between track data files.

Next, the relation between music programs and ATRAC3 data files is described. One track is equivalent to one music program. In addition, one music program is composed of one ATRAC3 data (see FIG. 6). The ATRAC3 data file is recorded one cluster at a time into the memory card 40. Each cluster has a capacity of 16 KB. Only one file is contained in each cluster. The minimum erasable unit of data for the flash memory 42 is one block. A block is synonymous with a cluster or a sector.

One music program (or track) is generally recorded in one part of a track data file. However, when the program is edited, the music program may be broken into a plurality of parts. The relationship between one or more parts containing a single music program is managed with part information PRTINF stored in the attribute header of each music program (see FIG. 6). The part size is represented with part size PRT-SIZE (4 bytes) of the part information PRTINF. The first two bytes of the part size PRTSIZE represents the number of total clusters in the current part. The next two bytes represent the positions of the start sound unit (SU) and the end sound unit (SU) of the first and last clusters, respectively. By this marking of parts, the movement of music data which occurs during editing can be tracked.

SU is the minimum unit of a part compressed according to the ATRAC3 format. One SU is comprised of 1024 samples at 44.1 kHz (1024×16 bits×2 channels) and can be compressed by a factor of 10. This corresponds to around 23 msec of audio. Normally, a single part contains several thousand SU. Thus, a cluster composed of 42 SU, stores about a second of audio.

Theoretically, the maximum number of parts comprising one track is 645. However, the actual number of parts usable in any given track is limited by the header, the program name, the additional data, and the size of the additional information.

FIG. 10 is a diagram showing the data arrangement of an ATRAC3 data file A3Dnnnn where 1 SU is N bytes (for example, N=384 bytes). FIG. 10 also shows an attribute header (1 block) of a data file and a music data file (1 block) along with the first byte (0x0000 to 0x7FFF) of each slot of the two blocks (16×2=32 kbytes). As shown in FIG. 11, the first 32 bytes of the attribute header are used as a header; 256 bytes are used as a music program area NM1 (256 bytes); and 512 bytes are used as a music program title area NM2 (512 bytes). The header of the ATRAC3 data file contains the following areas:

=BLKID-HD0 (4 bytes)
Meaning: BLOCKID FIELD ID
Function: Identifies the top of an ATRA3 data file.
Value: Fixed value="HD=0" (For example, 0x48442D30)
=MCode (2 bytes)
Meaning: MAKER CODE
Function: Identifies the maker and model of the recorder/player
Value: High-order 10 bits (maker code); low-order 6 bits (machine code)
=BLOCK SERIAL (4 bytes)
Meaning: Track serial number
Function: Starts from 0 and increments by 1. Even if a music program is edited, this value does not vary.
Value: 0 to 0xFFFFFFFF.
=N1C+L (2 bytes)
Meaning: Represents the attribute of data (NM1) of a track (music program title).
Function: Represent the character code and language code of NM1 as one byte code.
Value: Same as SN1C+L
=N2C+L (2 bytes)
Meaning: Represents the attribute of data (NM2) of a track (music program title).
Function: Represent the character code and language code of NM1 as one byte code.
Value: Same as SN1C+L
=INFSIZE (2 bytes)
Meaning: Total size of additional information of current track.
Function: Represents the data size as a multiple of 16 bytes. When data is not recorded, this area should be all 0.
Value: 0x0000 to 0x3C6 (966)
=T-PRT (2 bytes)
Meaning: Number of total bytes
Function: Represents the number of parts that composes the current track.
Normally, the value of T-PRT is 1.
Value: 1 to 285 (645 dec).
=T-SU (4 bytes)
Meaning: Number of total SU.
Function: Represents the total number of SU in one track that is equivalent to the program performance duration.
Value: 0x01 to 0x001FFFFF
=INX (2 bytes) (Option)
Meaning: Relative position of INDEX
Function: Used as a pointer that represents the top of a representative portion of a music program. The value of INX is designated with a value of which the number of SU is divided by 4 as the current position of the program. This value of INX is equivalent to 4 times larger than the number of SU (around 93 msec).
Value: 0 to 0xFFFF (max, around 6084 sec)
=XT (2 bytes) (Option)
Meaning: Reproduction duration of INDEX
Function: Designates the reproduction duration designated by INX-nnn with a value of which the number of SU is divided by 4. The value of INDEX is equivalent to four times larger than the normal SU (around 93 msec).
Value: 0x0000 (no setting); 0x01 to 0xFFFE (up to 6084 sec); 0xFFFF (up to end of music program)

Next, the music program title areas NM1 and NM2 are described.

=NM1
Means: Character string of music program title
Function: Represents a music program title as one byte code (up to 256 characters) (variable length). The title area should be completed with an end code (0x00). The size should be calculated from the end code. When data is not recorded, null (0x00) should be recorded from the beginning (0x0020) of the area for at least one byte.
Value: Various character codes
=NM2
Means: Character string of music program title
Function: Represents a music program title as two byte code (up to 512 characters) (variable length). The title area should be completed with an end code (0x00). The size should be calculated from the end code. When data is not recorded, null (0x100) should be recorded from the beginning (0x0120) of the area for at least two bytes.
Value: Various character codes Data of 80 bytes starting from the fixed position (0x320) of the attribute header is referred to as track information area TRKINF. This area is mainly used to totally manage the security information and copy control information of the particular track. FIG. 12 shows a part of TRKINF. The TRKINF area contains the following areas.

=CONTENTS KEY (8 bytes)
Meaning: Value for each music program. The value of CONTENTS KEY is protected in the security block of the memory card and then stored.
Function: Used as a key for reproducing a music program. It is used to calculate the value of MAC.
Value: 0 to 0xFFFFFFFFFFFFFFFF
=MAC (8 bytes)
Meaning: Forged copyright information check value
Function: Represents the value generated with a plurality of values of TRKINF including contents cumulation numbers and a secret sequence number. The secret sequence number is a sequence number recorded in the secret area of the memory card. A non-copyright protection type recorder cannot read data from the secret area of the memory card. On the other hand, a copyright protection type recorder and a computer that operates with a program that can read data from a memory card can access the secret area.
=A (1 byte)
Meaning: Attribute of part.
Function: Represents the information of such as compression mode of a part.
Value: see discussion hereinafter (see FIGS. 12 and 13).

Next, the value of area A is described. In the following description, monaural mode (N=0 or 1) is defined as a special joint mode of which bit 7=1, sub signal=0, and main signal= (L+R). A player without copyright protection capability may ignore information bits 2 and 1.

Bit 0 of the area A states whether emphasis is on or off. Bit 1 indicates skip reproduction or normal reproduction. Bit 2 designates the data type such as audio data, FAX data, or the like. Bit 3 is undefined. Mode information for ATRAC3 is represented by the combination of bits 4, 5, and 6, as shown in FIG. 13. In other words, N indicates mode and is represented by 3 bits. In FIG. 13, for the five types of modes listed (monaural (N=0 or 1), LP (N=2), SP (N=4), EX (N=5), and HQ (N=7)), record duration (64 MB memory card only), data transmission rate, and the number of SU per block are provided. The number of bytes in each SU depends on the defined mode. In the monaural mode 1 SU is 136 bytes. In the LP mode 1 SU is 192 bytes. In the SP mode 1 SU is 304 bytes. In the EX mode 1 SU is 384 bytes. In the HQ mode 1 SU is 512 bytes. Bit 7 of area A represents ATRAC3 type modes (0: Dual, 1: Joint).

As an example, a 64 MB memory card used in the SP mode is described. A 64 MB memory card has 3968 blocks. In the SP mode, since 1 SU is 304 bytes, a block is comprised of 53 SUs. Hence, 1 SU is equivalent to (1024/44100) seconds. Thus, a 64 MB memory card stores (1024/44100)×53×(3968−10)=4863 seconds=81 minutes. The transmission rate is (44100/1024)×304×8=104737 bps.

Referring back to FIG. 12, the remainder of the areas of TRKINF will be described.

=LT (one byte)
Meaning: Reproduction restriction flag (bits 7 and 6) and security partition (bits 5 to 0).
Function: Represents a restriction of the current track.
Value: bit 7: 0=no restriction, 1=restriction
bit 6: 0=not expired, 1=expired
bits 5 to 0: security partition (reproduction prohibited other than 0)
=FNo (2 bytes)
Meaning: File number.
Function: Represents the initially recorded track number that designates the position of the MAC calculation value recorded in the secret area of the memory card.
Value: 1 to 0x190 (400)
=MG(D) SERIAL-nnn (16 bytes)
Meaning: Represents the serial number of the security block (security IC 20) of the recorder/player.
Function: Unique value for each recorder/player
Value: 0 to 0xFFFFFFFFFFFFFFFFFFFFFFFFFFFFFFFF
=CONNUM (4 bytes)
Meaning: Contents cumulation number
Function: Represents a unique value cumulated for each music program. The value is managed by the security block of the recorder/player. The upper limit of the value is 232 that is 4,200,000,000. Used to identify a recorded program.
Value: 0 to 0xFFFFFFFF
=YMDhms-S (4 bytes) (Option)
Meaning: Reproduction start date and time of track with reproduction restriction
Function: Represents the date and time at which data reproduction is permitted with EMD.
Value: Same as the notation of date and time of other areas
=YMDhms-E (4 bytes) (Option)
Meaning: Reproduction end date and time of track with reproduction restriction
Function: Represents the date and time at which data reproduction is expired with EMD.
Value: Same as the notation of date and time of other areas
=MT (1 byte) (Option)
Meaning: Maximum value of number of permitted reproduction times
Function: Represents the maximum number of reproduction times designated by EMD.
Value: 1 to 0xFF. When not used, the value of the area MT is 00.
=CT (1 byte) (Option)
Meaning: Number of reproduction times
Function: Represents the number of reproduction times in the number of permitted reproduction times. Whenever data is reproduced, the value of the area CT is decremented.
Value: 0x00 to 0xFF. When not used, the value of the area CT is 0x00. When bit 7 of the area LT is 1 and the value of the area CT is 00, data is prohibited from being reproduced.
=CC (1 byte)
Meaning: COPY CONTROL
Function: Controls the copy operation.
Value: (see FIG. 14) bits 6 and 7 represent copy control information. bits 4 and 5 represent copy control information of a high speed digital copy operation. bits 2 and 3 represent a security block authentication level. bits 0 and 1 are undefined.
Example of CC:
(bits 7 and 6)
11: Unlimited copy operation permitted
01: copy prohibited
00: one time copy operation permitted
(bits 3 and 2)
00: analog/digital input recording MG authentication level is 0. When digital record operation using data from a CD is performed, (bits 7 and 6): 00 and (bits 3 and 2): 00.
=CN (1 byte) (Option)
Meaning: Number of permitted copy times in high speed serial copy management system
Function: Extends the copy permission with the number of copy times, not limited to one time copy permission and copy free permission. Valid only in first copy generation. The value of the area CN is decremented whenever the copy operation is performed.
Value:
00: Copy prohibited
01 to 0xFE: Number of times
0xFF: Unlimited copy times Referring once again to FIG. 10, the track information area TRKINF is followed by a 24-byte part management information area (PRTINF) starting at 0x0370. When a track is composed of a plurality of parts, the addresses of the individual parts are successively arranged in PRTINF. FIG. 15 shows a portion of the PRTINF area. Next, the PRTINF area is described in order of arrangement.

=PRTSIZE (4 bytes)
Meaning: Part size
Function: Represents the size of a part. Cluster: 2 bytes (highest position), start SU: 1 byte (upper), end SU: 1 byte (lowest position).
Value: cluster: 1 to 0x1F40 (8000)
start SU: 0 to 0xA0 (160)
end SU: 0 to 0xA0 (16) (Note that SU starts from 0.)
=PRTKEY (8 bytes)
Meaning: Part encrypting value
Function: Encrypts a part. Initial value=0. Note that edit rules should be applied.
Value: 0 to 0xFFFFFFFFFFFFFFFF
=CONNUM0 (4 bytes)

Meaning: Initially generated contents cumulation number key

Function: Uniquely designates an ID of contents.

Value: Same value as the value of the contents cumulation number initial value key As is next shown in FIG. 10, the attribute header of an ATRAC3 data file E contains an additional information INF area. The additional information is the same as the additional information INF-S area (see FIGS. 7 and 8) of the reproduction management file except that the start position is not fixed. The last byte position (a multiple of four bytes) at the end of one or a plurality of parts is followed by the additional information INF area.

=INF

Meaning: Additional information with respect to track

Function: Represents variable length additional information with a header. A plurality of different types of additional information may be arranged. Each of additional information areas has an ID and a data size. Each additional information area is composed of at least 16 bytes and a multiple of 4 bytes.

Value: Same as additional information INF-S of reproduction management file

The above-described attribute header is followed by a plurality of data blocks. To each data block a header is added. Next, each block of the added header as shown in FIG. 16 is described.

=BLKID-A3D (4 bytes)

Meaning: BLOCKID FILE ID

Function: Identifies the top of ATRAC3 data.

Value: Fixed value="A3D" (for example, 0x41334420)

=MCode (2 bytes)

Meaning: MAKER CODE

Function: Identifies the maker and model of the recorder/player

Value: High-order 10 bits (maker code); low-order 6 bits (model code)

=CONNUM0 (4 bytes)

Meaning: Cumulated number of initially created contents

Function: Designates a unique ID for contents. Even if the contents are edited, the value of the area CONNUM0 is not changed.

Value: Same as the contents cumulation number initial key

=BLOCK SERIAL (4 bytes)

Meaning: Serial number assigned to each track

Function: Starts from 0 and increments by 1. Even if the contents are edited, the value of the area BLOCK SERIAL is not changed.

Value: 0 to 0xFFFFFFFF

=BLOCK-SEED (8 bytes)

Meaning: Key for encrypting one block

Function: The beginning of the block is a random number generated by the security block of the recorder/player. The random number is followed by a value incremented by 1. When the value of the area BLOCK-SEED is lost, since sound is not generated for around one second equivalent to one block, the same data is written to the header and the end of the block. Even if the contents are edited, the value of the area BLOCK-SEED is not changed.

Value: Initially 8-bit random number

=INITIALIZATION VECTOR (8 bytes)

Meaning: Value necessary for encrypting/decrypting ATRAC3 data

Function: Represents an initial value necessary for encrypting and decrypting ATRAC3 data for each block. A block starts from 0. The next block starts from the last encrypted 8-bit value at the last SU. When a block is divided, the last eight bytes just before the start SU is used. Even if the contents are edited, the value of the area INITIALIZATION VECTOR is not changed.

Value: 0 to 0xFFFFFFFFFFFFFFFF

=SU-nnn

Meaning: Data of sound unit

Function: Represents data compressed from 1024 samples. The number of bytes of output data depends on the compression mode. Even if the contents are edited, the value of the area SU-nnn is not changed. For example, A, in the SP mode, N=384 bytes.

Value: Data value of ATRAC3

In FIG. 10, since N=384, 42 SUs are written to one block. The first two slots (4 bytes) of the block are used as a header. In the last slot (two bytes), BLKID-A3D, MCode, CONNUM0, and BLOCK SERIAL are redundantly written. Thus, M bytes of the remaining area of one block is (16,384−384×42−16×3=208) bytes. As described above, the eight-byte area BLOCK SEED is also redundantly recorded.

Further, the sound units SU(0)~(101) are each comprised of an 8-byte cryptogram $C_i$ created by encryption in units of 64-bit (8-byte) cipher blocks in the CBC (cipher block chaining) mode in the encrypting/decrypting unit 64 shown in FIG. 2. In the present embodiment, the number of bytes (for example 160 bytes) of the sound unit SU is made a whole multiple of the number of bytes (for example 8 bytes) of a cipher block, that is, the unit of encryption. Namely, one sound unit SU is comprised of, for example, 20 cryptograms $C_i$. Each cryptogram $C_i$ is located within a sound unit SU, and a cryptogram Ci never straddles a plurality of sound units SUs.

The audio data stored in flash memory 34 is compressed as mentioned later. The unit of compression is the sound unit SU. Accordingly, when audio data is read from the portable storage device 3 to the portable player 4, the minimum readable unit is a sound unit SU. Because of this, there are no breaks between encryption blocks and the processing load to access the data is thereby reduced when accessing encrypted audio data stored in the flash memory 34. Note that the number of sound units SU contained in each cluster may be any number within a range from 1 to 102. Further, the compression method for the audio data may be ATRAC3 or another CODEC method.

The block seed data BS is created by generating random numbers for every cluster and, as mentioned later, is used when creating block key data BK for every block in portable player 4. The block seed data BS is stored in two positions in each block as a countermeasure against errors. Further, the sound units in each of the clusters is stored at consecutive addresses in flash memory 34 by order of encryption. Thus, the encryption blocks are stored consecutively in flash memory 34 in the order of encryption.

Flash Memory Management Module 35

The flash memory management module 35 performs control for the writing of data to the flash memory 34 and for the reading of data from the flash memory 34, etc. . . .

Portable Player 4

As shown once again in FIG. 2, portable player 4 is comprised of a main control module 41, a communication interface 42, a control module 43, an edit module 44, a compression/expansion module 45, a speaker 46, a D/A converter 47, and an A/C converter 48.

Main Control Module 41

Main control module 41 centrally controls processing by the portable player 4.

Control Module 43

Control module 43 includes a random number generation unit 60, a storage unit 61, a key creation/key processing unit 62, a mutual identification unit 63, an encrypting/decrypting unit 64, and a control unit 65.

Control module 43 may be formed as a single chip integrated circuit with a multi-layer structure similar to the control module 33 used exclusively for encryption. The internal memory cells are sandwiched between dummy layers (such as aluminum layers). Further, control module 43 has a narrow range of operating voltage or operating frequency and is tamper resistant to prevent data form being illicitly read from the outside.

Random number generation unit 60 generates a 64 bit (8-byte) random number upon receipt of a random number generation instruction.

Storage unit 61 stores various data required for the identification. As shown in FIG. 17, storage unit 61 stores the master key data $MK_0$ to $MK_3$, and the device identification data $ID_m$.

Equation (1) below shows the relationship between the master key data $MK_0$ to $MK_{31}$, identification keys $IK_0$ to $IK_{31}$, and the device identification data $ID_m$. In the following equation, f(a b) is a function for deriving a value from the arguments a and b.

$$IK_j = f(MK_j, ID_m) \tag{1}$$

where, j is an integer satisfying $0 \leq j \leq 31$.

The storage addresses of the identification keys $IK_0$ to $IK_{31}$ in the storage unit 61 are expressed by 5 bits. They are assigned corresponding storage addresses with those for the master key data $MK_0$ to $MK_{31}$ in the storage unit 51.

Key creation/key processing unit 62 creates the key data by performing various operations (e.g., the MAC operation defined in ISO/IEC9797). At this time, DES prescribed in FIPS PUB 46-2 is used as the "block cipher algorithm".

Mutual identification unit 63 performs a mutual identification process with the portable storage device 3 prior to the transfer of audio data from computer 2 to portable storage device 3. Mutual identification unit 63 also performs a mutual identification process with portable storage device 3 before the receipt of audio data from portable storage device 3. Further, mutual identification unit 63 performs the MAC operation and makes use of the data stored in the storage unit 61, during a mutual identification process. Mutual identification unit 63 performs the mutual identification process with computer 2 or the computer on network 5 before audio data is input or output to those devices.

Encrypting/decrypting unit 64 performs block encryption by selectively using the ECB mode or CBC mode described in FIPS PUB 81. Encrypting/decrypting unit 64 uses the 56-bit key k in the CBC mode to encrypt audio data (plain text) input from computer 2 or CD player 7 in units of cipher blocks consisting of 64 bits based on equation (2) below, thereby creating the encrypted audio data (cryptogram).

Figure 18:
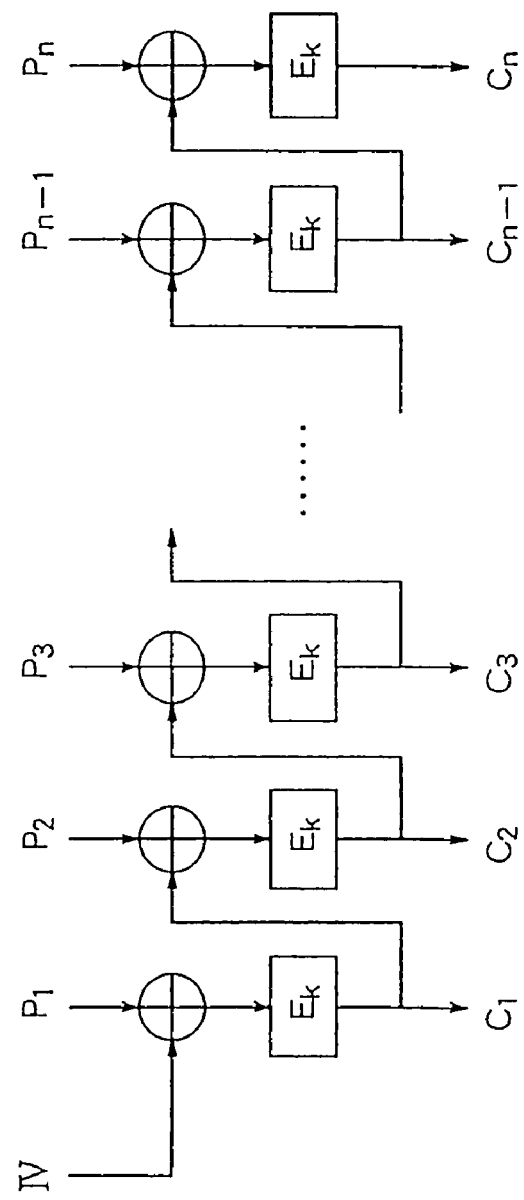
FIG. 18 explains the CBC mode of encryption in the encrypting/decrypting unit of the portable player shown in FIG. 2.

In the CBC mode, the preceding is used to encrypt the following group of data. Thus, a different cryptogram is output even when identical data is input. This makes deciphering difficult.

$$C_i = E_k(P_i \text{ XOR } C_{i-1}) \tag{2}$$

where,
i: integer of 1 or more
$P_i$: plain text (64 bits)
$C_i$: cryptogram (64 bits)
XOR: exclusive OR, and
$E_k$: encryption by DES system using 56-bit key data k The operation of equation (2) will now be explained making reference to FIG. 18. "IV" is the block encryption initial value (64 bits) and is stored immediately preceding the sound unit SU(0) in the cluster CL in the flash memory 34 of portable storage device 3.

ATRAC is the coding and compressing method used in MiniDisks®, and in which a 288 kbit/s 44.1 kHz sample stereo signal is encoded using band division and MDCT (modified discrete cosine transform) First, data is divided into three bands of ¼, ¼, and ½, by a band division filter, signals of bands are down-sampled and converted into the frequency domain by MDCT and the coefficient of the MDCT is scalarly quantized by adaptive bit distribution.

Figure 19:
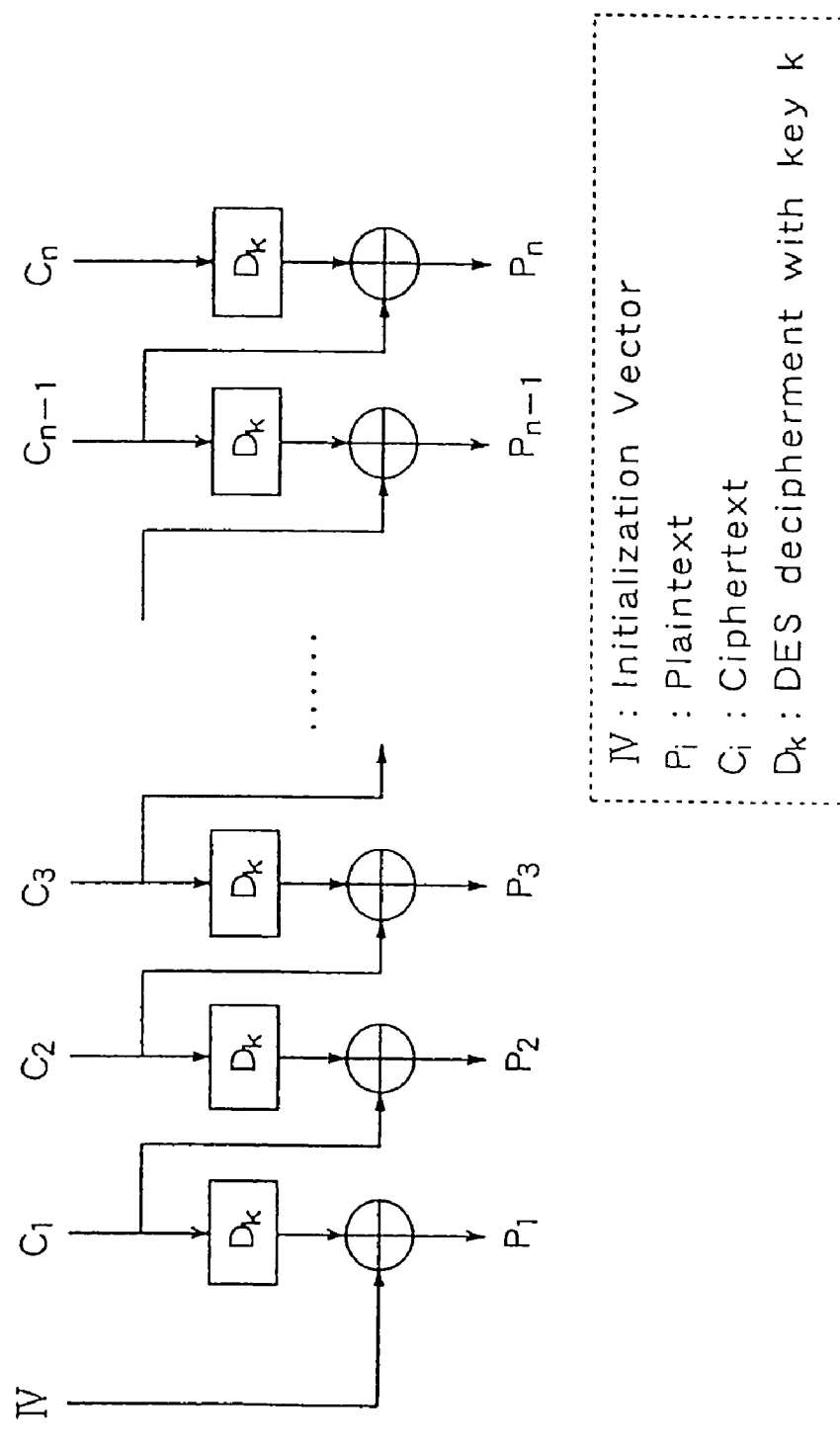
FIG. 19 explains the CBC mode of decryption in the encrypting/decrypting unit of the portable player shown in FIG. 2.

Encrypting/decrypting unit 64 selectively performs decryption using the ECB mode and CBC mode 15 from amongst the FIPS81 modes. Encrypting/decrypting unit 64 creates plain text by decrypting a cryptogram in units of cypher blocks using the 56-bit key k in accordance with equation (3), shown below.

$$P_i = C_{i-1} \text{ XOR } D_k(C_i) \tag{3}$$

where,
i: integer of 1 or more
$P_i$: plain text (64 bits)
$C_i$: cryptogram (64 bits)
XOR: exclusive OR, and
$D_k$: decryption of DES system using 56-bit key data The operation of equation (3) will now be explained making reference to FIG. 19. Note that, in FIG. 19, "IV" is the block encryption initial value (64 bits) and is stored immediately preceding the sound unit SU(0) in the cluster CL in the flash memory 34 of the portable storage device 3.

Control unit 65 centrally controls the processing of random number generation unit 60, storage unit 61, key creation/processing unit 62, mutual identification unit 63, and the encrypting/decrypting unit 64.

Editing Module 44

Editing module 44 edits the track data files $101_0$ to $101_3$ (see FIG. 4) stored in flash memory 34 of portable storage device 3 to create a new track data file based on an instruction from the user. This editing can include divisional editing where one track data file is divided into two track data files, and coupled editing where two track data files are merged into one track data file. As a result of such editing, the reproduction management file 100 and the track data files $101_0$ to $101_3$ are rewritten as necessary.

Compression/Expansion Module 45

As part of the process to reproduce encrypted audio data, the compression/expansion module 45 expands compressed ATRAC3 audio data and outputs it to D/A converter 47. Further, module 45 compresses audio data using the ATRAC3 format when storing audio data input from CD player 7 or computer 2 in portable storage device 3.

D/A Converter 47

The D/A converter 47 converts digital audio data input from compression/expansion module 45 to analog audio data which is output to the speaker 46.

Speaker 46

The speaker 46 outputs sound according to the audio data input from the D/A converter 47.

A/D Converter 48

The A/D converter 48 converts analog audio data input from CD player 7 into digital data for output to compression/expansion module 45.

Write Operation to Portable Storage Device 3

Figure 20:
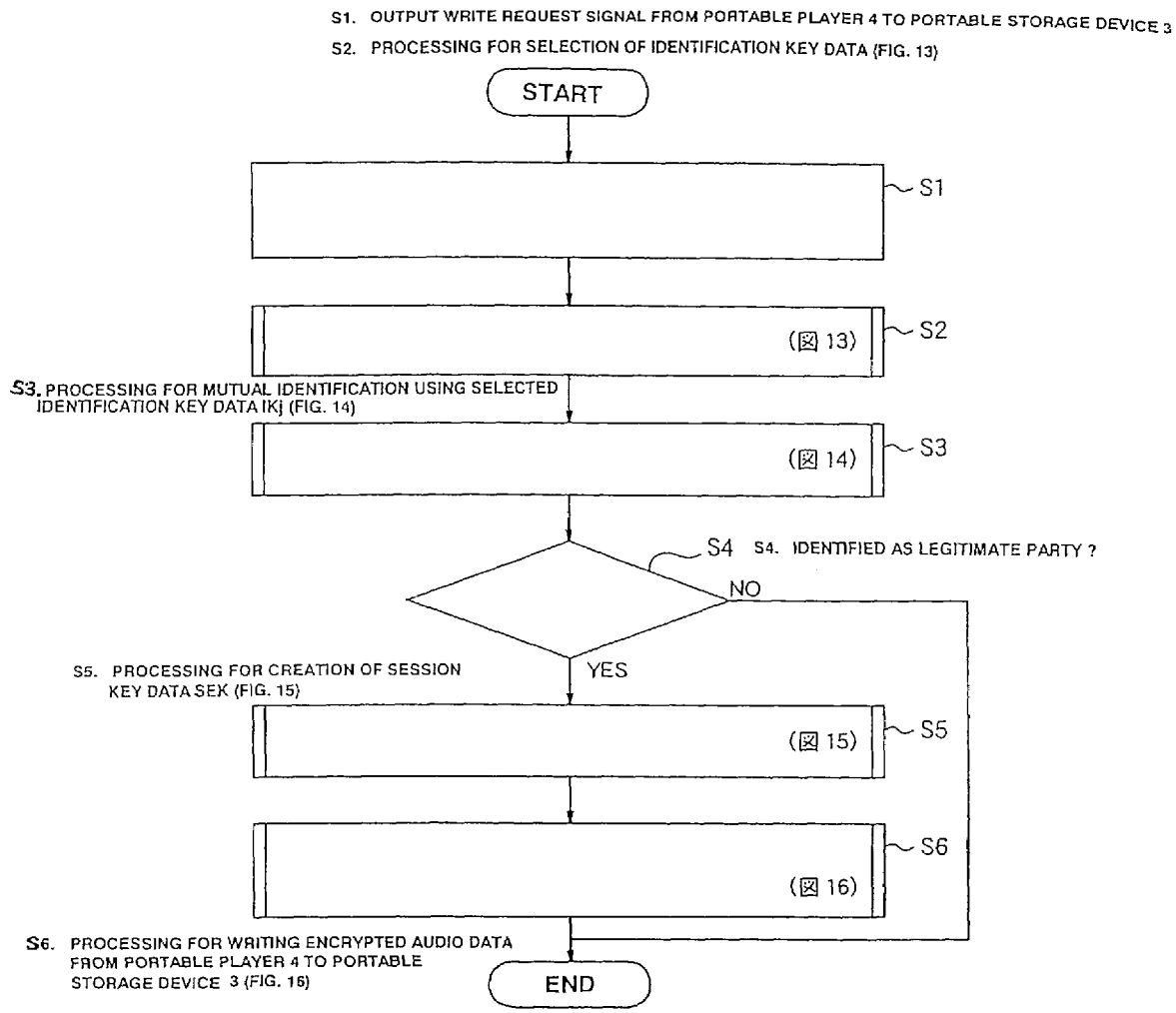
FIG. 20 is a flow chart for explaining a write operation from the portable player to the portable storage device shown in FIG. 2.

FIG. 20 is a flow chart explaining an operation for writing data from portable player 4 to portable storage device 3.

Step S1: A write request signal is sent from portable player 4 to portable storage device 3.

Step S2: The identification key data $IK_j$ used for mutual identification between portable storage device 3 and portable player 4 is selected. The processing in this step is explained in greater detail below.

Step S3: A mutual identification process is performed between portable storage device 3 and portable player 4. The processing in this step is explained in greater detail below.

Step S4: When portable storage device 3 and portable player 4 each recognize that the other party is legitimate in accordance with the mutual identification process of step S3, control passes to step S5. Otherwise, processing is terminated.

Step S5: A session key data Sek is created in both portable storage device 3 and portable player 4. The processing in this step will be explained in greater detail below.

Step S6: Encrypted audio data is output and written from portable player 4 to portable storage device 3 via communication interfaces 32 and 42. The processing in this step will be explained in greater detail below.

In this manner, a mutual identification process is carried out between portable storage device 3 and portable player 4, and the encrypted audio data is written from portable player 4 to portable storage device 3 only when each recognizes the other party as legitimate. By this method, illicit copying of audio data is easily avoided.

Selection of Identification Key Data $IK_j$ (Step S2 of FIG. 20)

Figure 21:
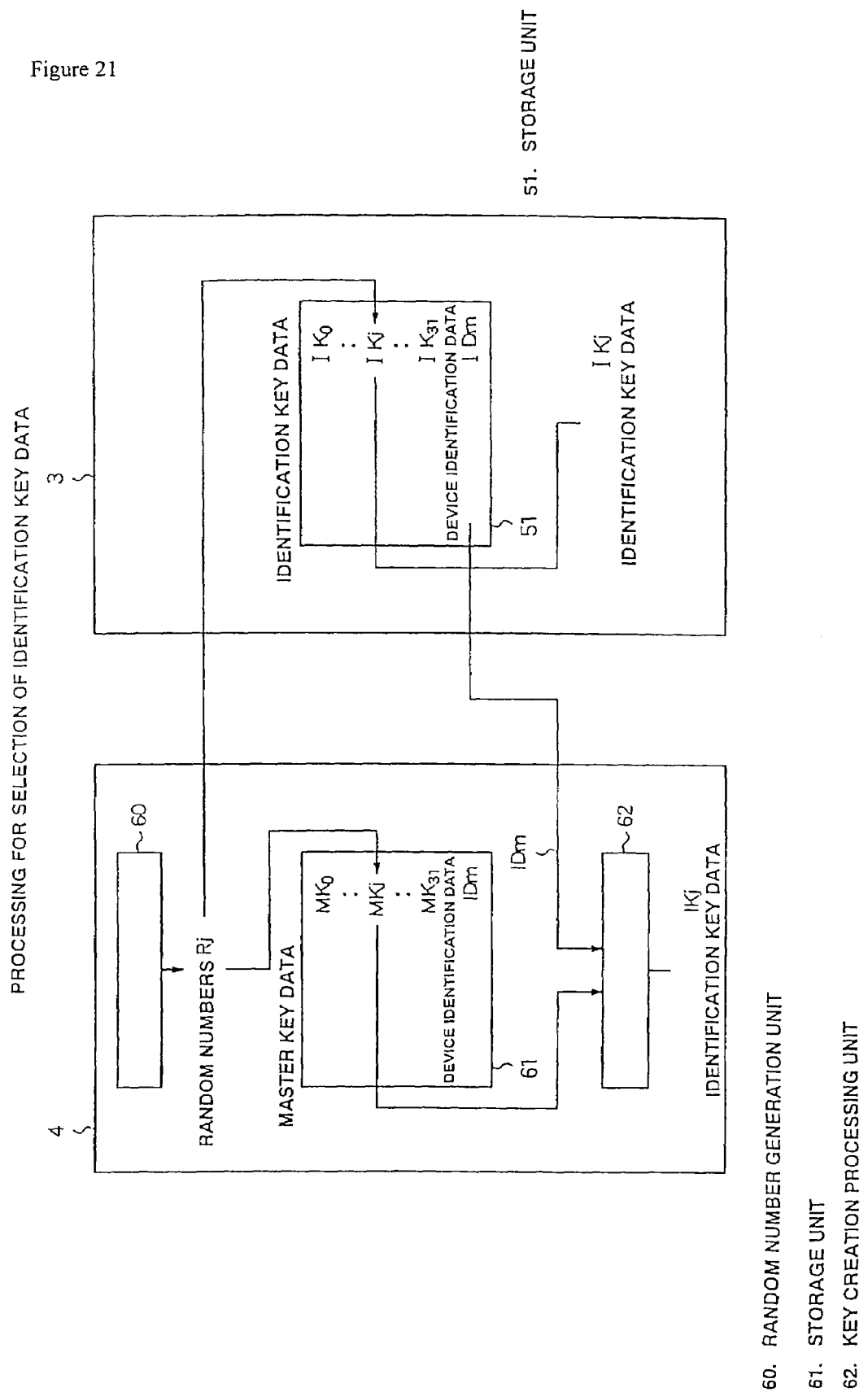
FIG. 21 depicts the selection of the identification key data $IK_j$ by the mutual identification unit shown in FIG. 2.

FIG. 21 explains the selection of the identification key data $IK_j$ as originally noted in step S2 of FIG. 20. A 64-bit random number $R_j$ is created by random number generation unit 60 of portable player 4 shown in FIG. 2. The random number $R_j$ is output from portable player 4 to portable storage device 3. Mutual identification unit 53 of portable storage device 3 uses the lower significant 5 bits of the 64-bit random number $R_j$ to specify an identification key data $IK_j$ (where j is an integer satisfying $0 \leq j \leq 31$) from the prestored identification key data $IK_0$ to $IK_{31}$ stored in storage unit 51. The device identification data $ID_m$ is similarly read from storage unit 51 of portable storage device 3 and output to portable player 4. The mutual identification unit 63 of portable player 4 uses the lower significant 5 bits of the random number $R_j$ to specify a master key data $MK_j$ from the prestored master key data $MK_0$ to $MK_{31}$.

Key creation/key processing unit 62 uses the specified master key data $MK_j$ and the device identification data $ID_m$ to create the identification key data $IK_j$ based on equation (4), shown below. Note, f(a, b) is any function for deriving a value from, for example, the arguments a and b.

$$IK_j = f(MK_j, ID_m) \quad (4)$$

Once portable storage device 3 and portable player 4 have the identification key data $IK_0$ to $IK_{31}$ and the master key data $MK_0$ to $MK_{31}$ having the relationship shown in equation (4), the same identification key data $IK_j$ is selected by the processing shown in FIG. 21.

The selected identification key data $IK_j$ is used as the secret key in the mutual identification process, as will be described below. Whenever the processing shown in FIG. 21 is carried out, the identification key data is selected at random according to the random number $R_j$ from among the 32 identification key data $IK_j$. This reduces the probability of successfully faking illicit identification to 1/32 of that of the case where only one identification key data is used, thus providing a high probability of avoiding illicit identification.

In the above embodiment, the identification key data is selected using a random number. But it is also possible to determine the identification key data based on a key designation signal input from outside of portable storage device 3 and portable player 4.

Mutual Identification Between Portable Storage Device 3 and Portable Player 4 (step S3 of FIG. 20)

Figure 22:
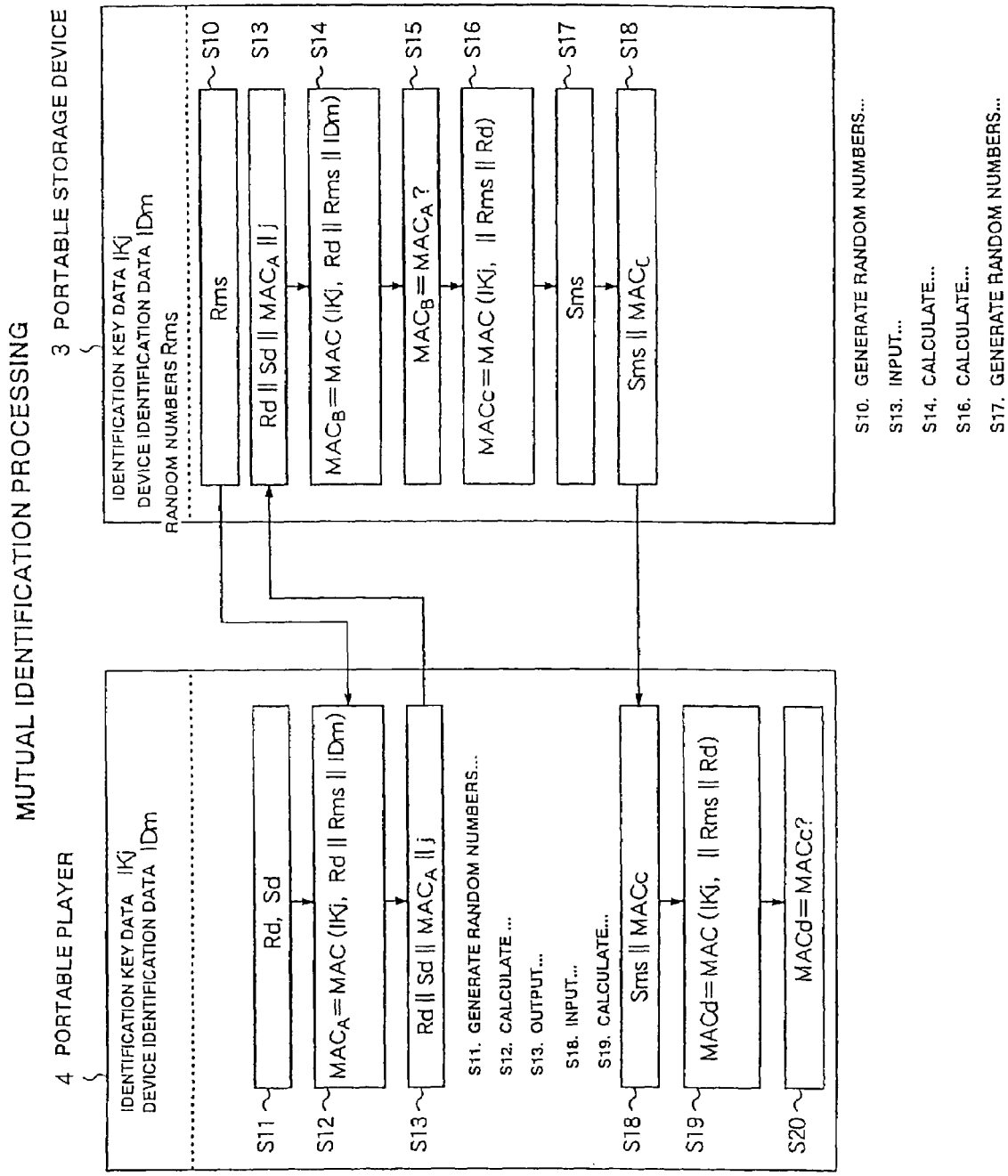
FIG. 22 explains a mutual identification process between the portable storage device and the portable player shown in FIG. 2.

FIG. 22 is a view for explaining the mutual identification process performed between portable storage device 3 and portable player 4. Prior to starting the mutual identification process, the selection of the identification key data $IK_j$ shown in FIG. 21 has been completed and mutual identification unit 53 of portable player 4 has the selected identification key data $IK_j$ and the device identification data $ID_m$. Further, mutual identification unit 63 of portable storage device 3 has the selected identification key data $IK_j$ and the device identification data $ID_m$ of portable storage device 3. The mutual identification proceeds as follows.

Step S10: Random number generation unit 50 of portable storage device 3 creates a 64-bit random number $R_{ms}$ and outputs it to portable player 4.

Step S11: Random number generation unit 60 of portable player 4 creates the 64-bit random numbers $R_d$ and $S_d$.

Step S12: Mutual identification unit 63 of portable player 4 uses the identification key data $IK_j$ obtained at step S2 shown in FIG. 20 and "$R_d \| R_{ms} \| ID_m$" to carry out a MAC operation based on equation (5) as shown below, to find $MAC_A$. Here, A∥B indicates the coupling of A and B (coupling of m-bit B to end of n-bit A to make (n+m) bits).

$$MAC_A = MAC(IK_j, R_d \| R_{ms} \| ID_m) \quad (5)$$

Step S13: Portable player 4 outputs "$R_d \| S_d \| MAC_A \| j$" to portable storage device 3.

Step S14: Mutual identification unit 53 of portable storage device 3 uses identification key data $IK_j$ obtained at step S2 shown in FIG. 20 and the "$R_d \| R_{ms} \| ID_m$" to carry out a MAC operation based on equation (6), as shown below, to find $MAC_B$.

$$MAC_B = MAC(IK_j, R_d \| R_{ms} \| ID_m) \quad (6)$$

Step S15: Mutual identification unit 53 of portable storage device 3 compares the $MAC_B$ found at step S14 and the $MAC_A$ input at step S13. If they coincide, the portable player 4 has an adequate identification key data $IK_j$, so portable storage device 3 identifies it as a legitimate party.

Step S16: Mutual identification 53 of portable storage device 3 uses identification key data $IK_j$ obtained at step S2 shown in FIG. 20 and "$R_{ms} \| R_d$" to carry out a MAC operation based on equation (7) to find $MAC_C$.

$$MAC_C = MAC(IK_j, R_{ms} \| R_d) \quad (7)$$

Step S17: Random number generation unit 50 of portable storage device 3 creates the 64-bit random number $S_{ms}$.

Step S18: "$S_{ms} \| MAC_C$" is output from portable storage device 3 to portable player 4.

Step S19: Mutual identification unit 63 of portable player 4 carries out the MAC operation based on equation (8) to find $MAC_d$.

$$MAC_d = MAC(IK_j, R_{ms} \| R_d) \quad (8)$$

Step S20: Mutual identification unit 53 of portable player 4 compares $MAC_d$ found at step S19 and $MAC_C$ input at step S18. If they coincide, portable storage device 3 has an adequate identification key data $IK_j$, so portable player 4 identifies it as a legitimate party.

In accordance with the above, mutual identification between portable storage device 3 and portable player 4 is achieved.

Creation of Session Key Data Sek (Step S5 of FIG. 20)

Figure 23:
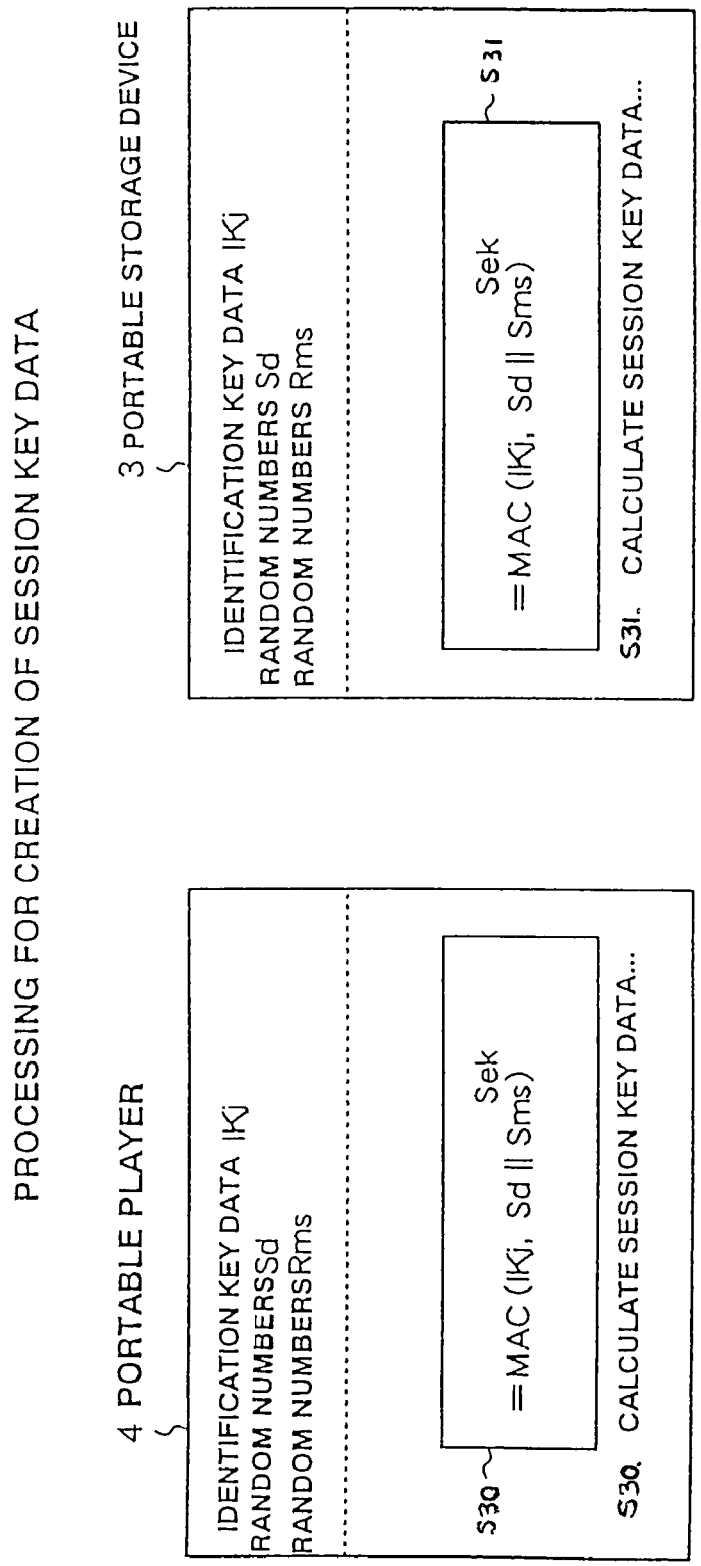
FIG. 23 explains the creation of the session key data Sek.

FIG. 23 explains the creation of the session key data Sek. Prior to starting the creation of the session key data Sek, the selection of the identification key data $IK_j$ shown in FIG. 21 and the mutual identification process shown in FIG. 22 are complete. Both portable storage device 3 and portable player 4 have the selected identification key data $IK_j$ and the random numbers $S_d$ and $S_{ms}$. The creation of session key data Sek progresses as follows.

Step S30: Mutual identification unit 63 of portable player 4 uses the selected identification key data IKj and "$S_d\|S_{ms}$" to perform a MAC operation based on equation (9) to create the session key data Sek.

$$Sek=MAC(IK_j, S_d\|S_{ms}) \quad (9)$$

Step S31: Mutual identification unit 53 of portable storage device 3 uses the selected identification key data $IK_j$ and "$S_d\|S_{ms}$" to perform a MAC operation based on equation (10) to create the session key data Sek.

$$Sek=MAC(IK_j, S_d\|S_{ms}) \quad (10)$$

The session key data Sek created at portable storage device 3 is the same as the session key data Sek created at portable player 4 if both parties are legitimate.

Writing of Audio Data into Portable Storage Device 3 (Step S6 of FIG. 20)

Figure 24:
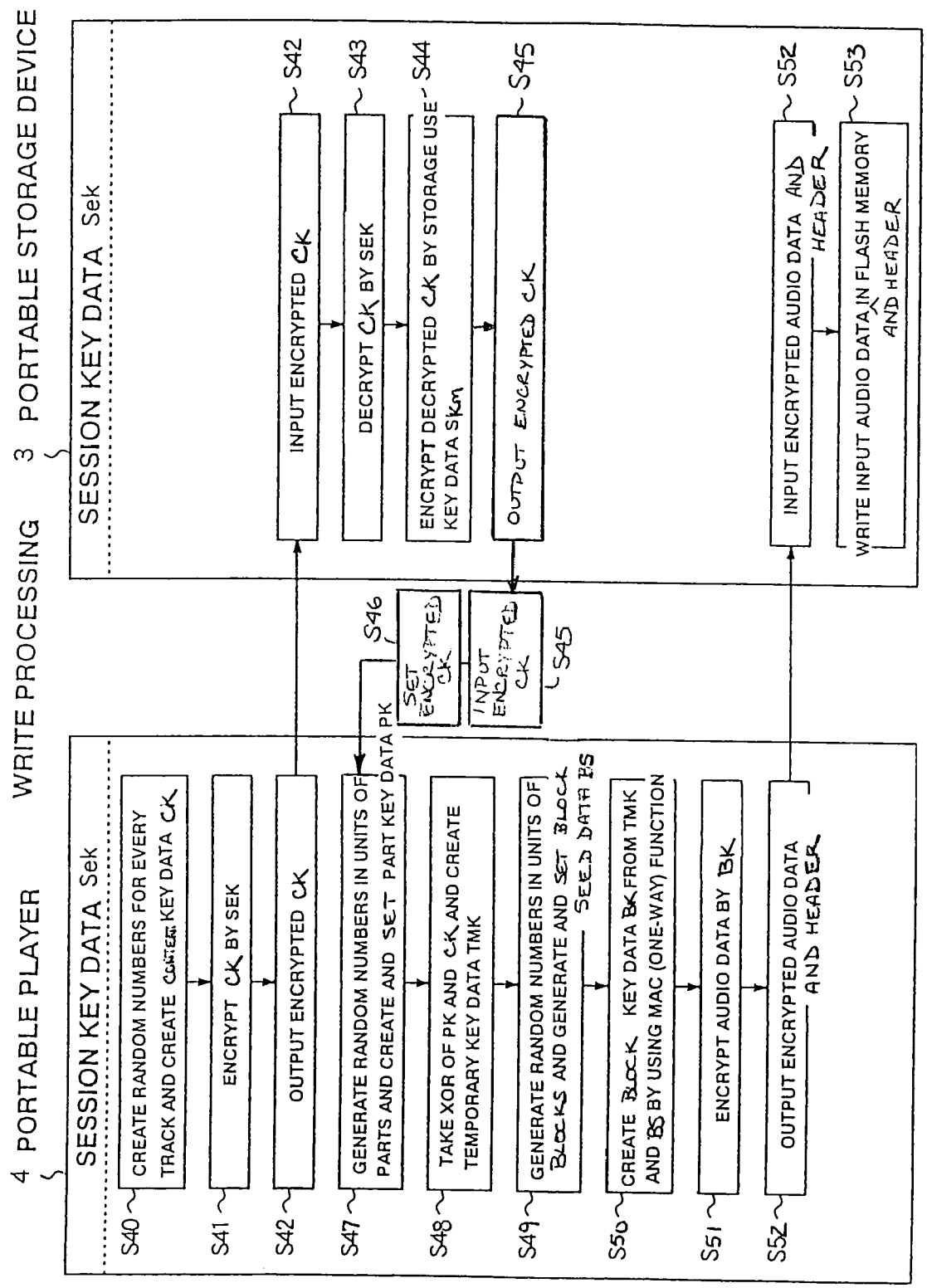
FIG. 24 explains the write operation of audio data from the portable player to the portable storage device shown in FIG. 2.

FIG. 24 explains the write processing of audio data from portable player 4 into portable storage device 3. Prior to starting the write processing, the creation processing of the session key data Sek shown in FIG. 23 has been completed and portable storage device 3 and portable player 4 have the same session key data Sek. The writing of audio data into portable storage device 3 progresses as follows.

Step S40: Portable player 4 requests random number generation unit 60 to generate a random number for each track and create a corresponding content key data CK according to each of the random numbers.

Step S41: Portable player 4 encrypts content key data CK created at step S40 in encrypting/decrypting unit 64 by using the session key data Sek.

Step S42: Portable player 4 outputs content key data CK encrypted at step S41 to portable storage device 3.

Step S43: Portable storage device 3 decrypts encrypted content key data CK input at step S42 in encrypting/decrypting unit 54.

Step S44: Portable storage device 3 encrypts content key data CK decrypted at step S43 in the encrypting/decrypting unit 54 by using the storage use key data Skm read from storage unit 51.

Step S45: Portable storage device 3 outputs the encrypted CK to the portable player 4.

Step S46: Portable player 4 sets the related encrypted content key data CK in the TRKINF in track data file $101_n$.

Step S47: Random number generation unit 60 generates a random number for each part of a track data file and creates part key data PK according to the random number. The created part key data PK is set in the management data PRTINF of track data file $101_n$.

Step S48: The XOR of part key data PK created at step S45 and content key data CK is obtained in key creation/processing unit 62 for each part of the track data file as shown below in equation (11). The result of the processing is the generation of a temporary key data TMK. The creation of temporary key data TMK is not limited to using an XOR function. It is possible to use other functional operators, such as a simple AND operator.

$$TMK=PK \text{ XOR } CK \quad (11)$$

Step S49: Random number generation unit 60 generates a random number for each block and creates block seed data BS according to the random number. Further, portable player 4 sets the created block seed data BS into its proper position in each corresponding block.

Step S50: Key creation/key processing unit 62 uses the temporary key data TMK created at step S46 and the block seed data BS created at step S47 in equation (12) to perform a MAC operation and create block key data BK for each block.

$$BK=MAC(TMK, BS) \quad (12)$$

It is possible to perform processing other than a MAC operation by using the secret key on the input of a SHA-1 (secure Hash algorithm), RIPEMD-160, or other one-way Hash function to create block key data BK. Here, the one-way function f defines a function from which it is easy to calculate $y=f(x)$ from x, but conversely difficult to find x from y. A one-way Hash function is described in detail in the "Handbook of Applied Cryptography, CRC Press".

Step S51: Portable player 4 compresses the audio data input from computer 2 or portable player 4 in accordance with the ATRAC3 format in compression/expansion module 45. Then, encrypting/decrypting unit 64 encrypts the compressed audio data in the CBC mode by using the block key data BK created at step S50.

Step S52: Portable player 4 adds headers to the audio data encrypted at step S51 and outputs them via the communication interfaces 32 and 42 to portable storage device 3.

Step S53: Portable storage device 3 writes the encrypted audio data and header into flash memory 34.

At this point, writing of the audio data from the portable player 4 to the portable player 4 is complete. Although the above description only discusses writing track data files $101_0$ to $101_3$, the portable player 4 also writes the reproduction management file 100 in this manner.

Reading from Portable Storage Device 3

Figure 25:
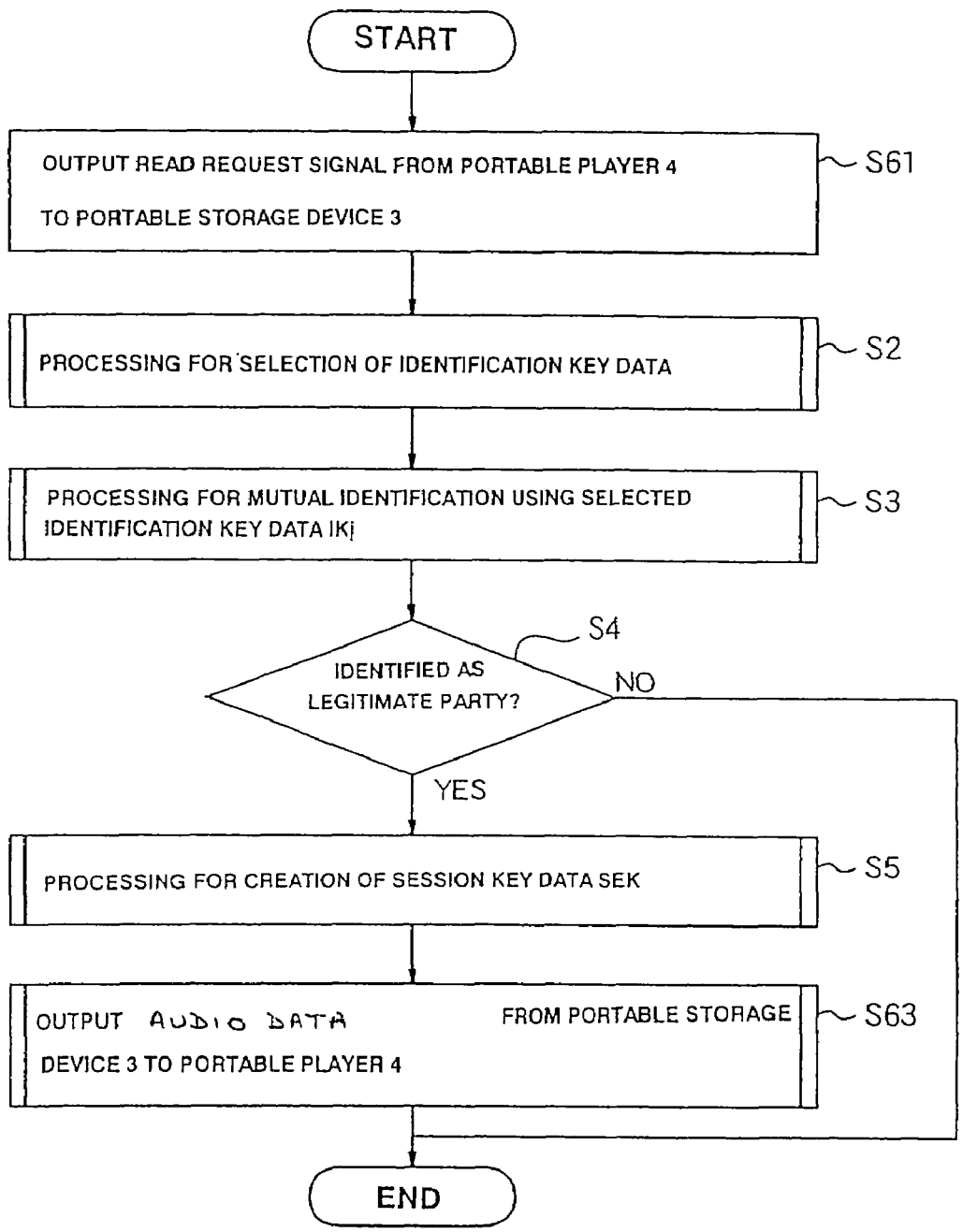
FIG. 25 is a flow chart explaining a read operation from the portable storage device to the portable player shown in FIG. 2.

FIG. 25 is a flow chart explaining a read operation for reading data from portable storage device 3 to portable player 4.

Step S61: A read request signal specifying a desired track data (tune) is sent from portable player 4 to portable storage device 3.

Step S2: The identification key data $IK_j$ used when performing the mutual identification between the portable storage device 3 and the portable player 4 is selected in a manner as described above.

Step S3: Mutual identification processing is performed between portable storage device 3 and portable player 4 in a manner as described above.

Step S4: Where both portable storage device 3 and portable player 4 identify each other as legitimate, the processing proceeds. Otherwise, processing is terminated.

Step S5: Session key data Sek is created at portable storage device 3 and portable player 4 in a manner as described above.

Step S63: The encrypted audio data is read via communication interfaces 32 and 42 from portable storage device 3 to portable player 4. This processing will be explained in greater detail below.

Mutual identification is carried out between portable storage device 3 and portable player 4. Only when the two parties identify each other as legitimate can the encrypted content key data be decrypted using the proper session key data Sek. Therefore, illicit utilization of the audio data is easily avoided.

Reading of Audio Data from Portable Storage Device 3 (Step S63 of FIG. 25)

Figure 26:
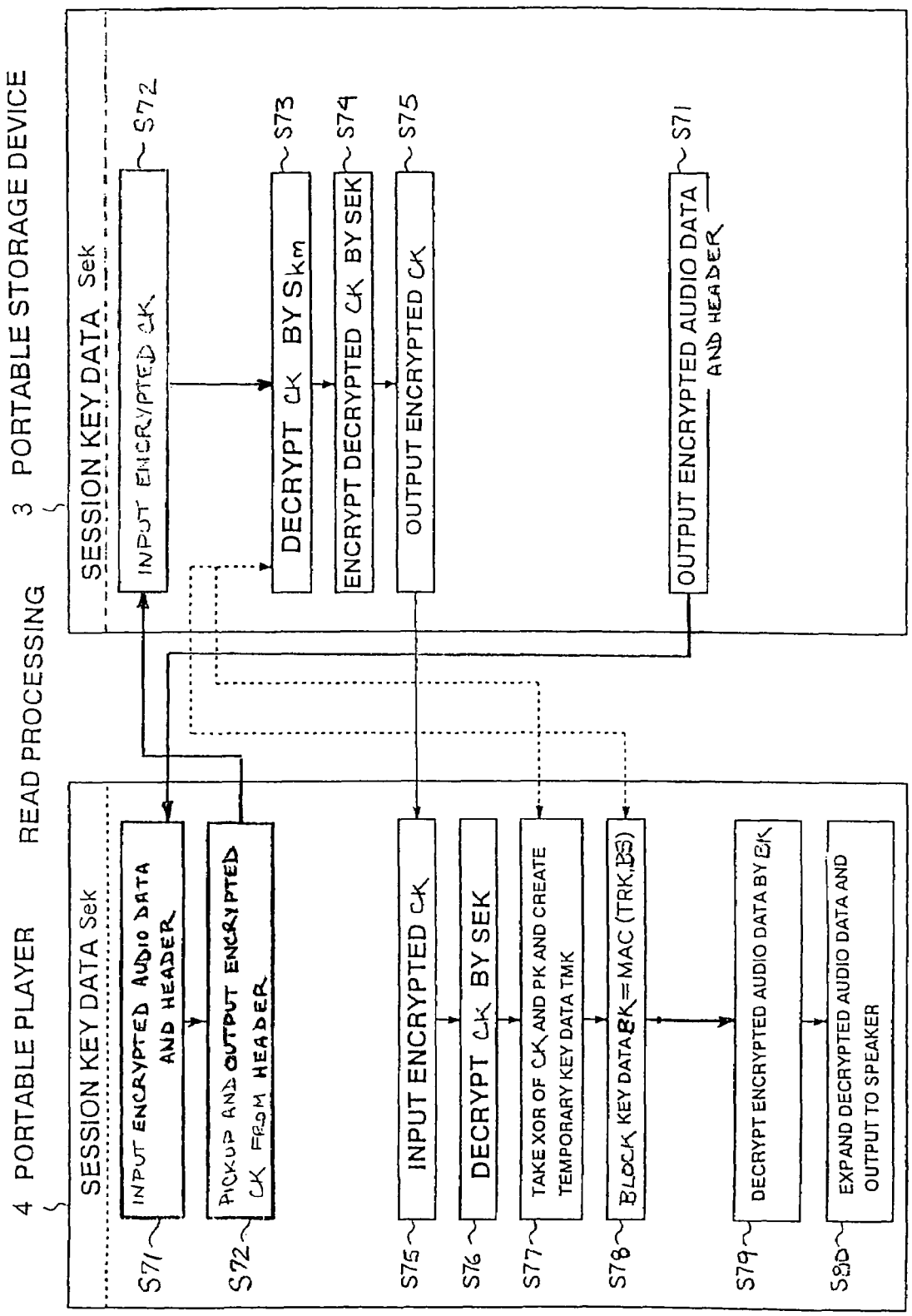
FIG. 26 explains the read operation of audio data from the portable storage device to the portable player shown in FIG. 2.

FIG. 26 explains the reading of audio data from portable storage device 3 to portable player 4. This reading step requires the data to be written by the above described method. The writing of the track data files $101_0$ to $101_3$ is critical to set the content key data CK in the TRKINF, the part key data PK in the PRTINF, and the block seed data BS in each cluster CL. Because the processing of step S5 is complete, portable storage device 3 and portable player 4 have the same session key data. The reading of audio data from portable storage device 3 proceeds as follows.

Step S71: Portable storage device 3 specifies the track data file corresponding to the read request signal and outputs the audio data in sound units SUs from the cluster comprising the specified track data. Portable storage device 3 also reads out the corresponding attribute header of the audio data and outputs it to portable player 4.

Step S72: Portable player 4 picks-up the CK from the TRKINF in the input attribute header and outputs it to portable storage device 3.

Step S73: Encrypting/decrypting unit 54 of portable storage device 3 decrypts the content key data CK input at step S72 using the storage key data Skm stored in storage unit 51.

Step S74: Encrypting/decrypting unit 54 of portable storage device 3 encrypts the content key data CK decrypted at step S73 using the session key data Sek obtained at step S5 shown in FIG. 25.

Step S75: Portable storage device 3 outputs the content key data CK encrypted at step S74 to portable player 4.

Step S76: Encrypting/decrypting unit 64 of portable player 4 decrypts the content key data CK input from the portable storage device 3 at step S73 using the session key data Sek.

Step S77: Key creation/processing unit 62 of portable player 4 obtains the XOR of the content key data CK decrypted at step S76 and the part key data PK from the PRTINF in the attribute header being input at step S71 and defines the result of the processing as the temporary key data TMK in accordance with equation (13).

$$TMK=PK \text{ XOR } CK \tag{13}$$

Step S78: Key creation/key processing unit 62 of portable player 4 uses the temporary key data TMK created at step S77 and the block seed data BS in the track data file inputted at step S71 to perform the MAC operation shown in the following equation (14) and defines the result of the processing as the block key data BK. The block key data BK is found for every cluster (block) as follows.

$$BK=MAC(TMK,BS) \tag{14}$$

Step S79: Portable player 4 decrypts the audio data input at step S71 in encrypting/decrypting unit 64 by using the block key data BK created at step S78.

At this point, the audio data is decrypted for every cluster (block) using the individually found block key data BK. Further, decryption is carried out in the same 8-byte blocks as used for encryption.

Step S80: Portable player 4 expands the audio data decrypted at step S79 by the ATRAC3 system in compression/expansion module 45 and converts the expanded audio data to a digital format at D/A converter 47 for output to speaker 46.

The audio data decrypted at step S78 is expanded in sound units SUs.

Divisional Editing of Track Data File

As previously mentioned, editing module 44 of portable player 4 is adapted to perform the divisional editing of dividing one track data file to create two track data files and the coupled editing of coupling two track data files to create one track data file.

Figure 27:
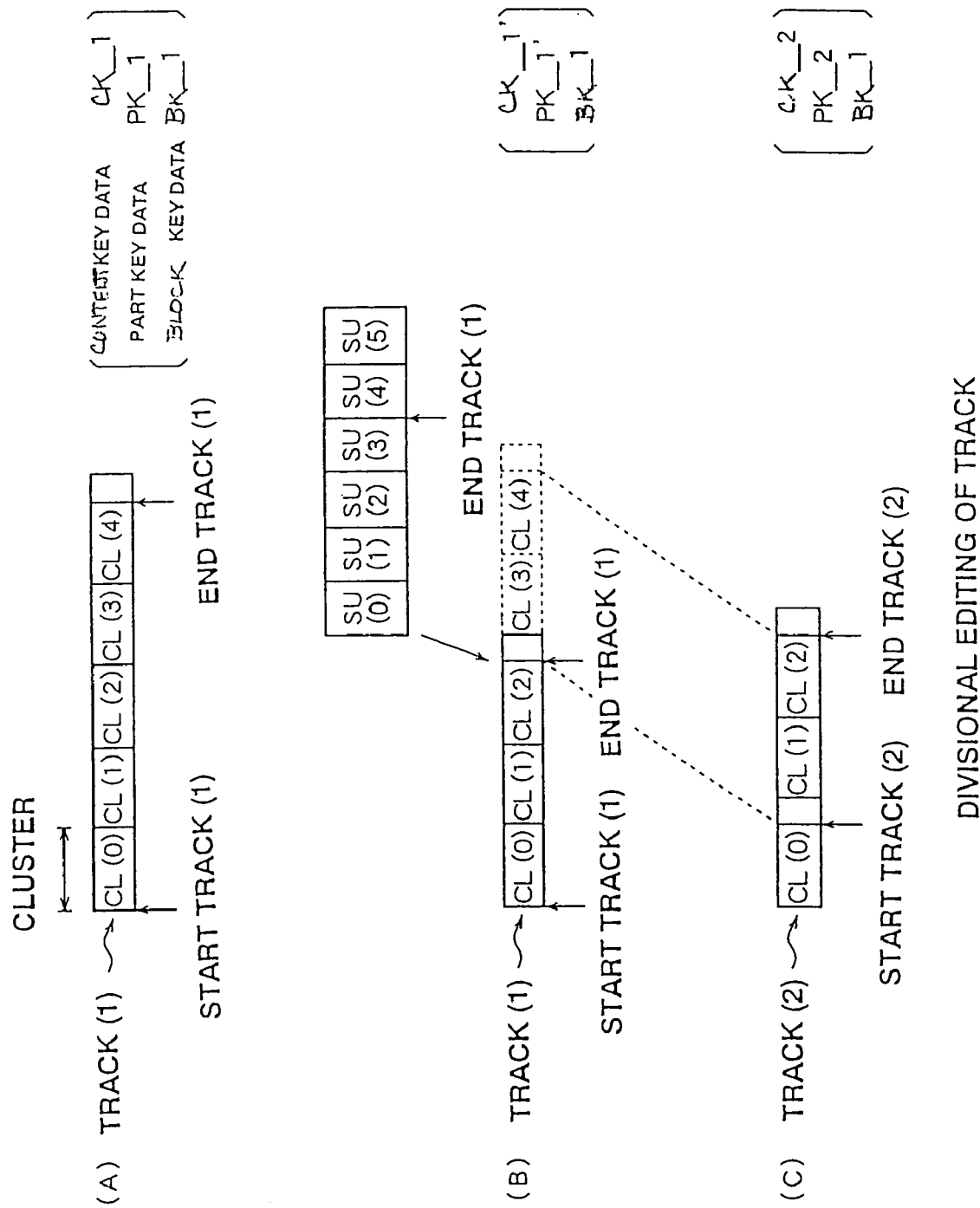
FIG. 27 explains the divisional editing of the track data file by the editing module of the portable player.

First, an explanation of divisional editing is provided. FIG. 27 explains the divisional editing of a track data file by editing module 44 of portable player 4. As an example, editing module 44 divides a track data file (1) shown in FIG. 27(A) into a new track data file (1) shown in FIG. 27(B) and a track data file (2) shown in FIG. 27(C). The minimum divisible unit is the sound unit SU. In this example, the sound units SU(3) and SU(4) of cluster CL(2) are divided as shown in FIG. 27(B).

After division, cluster CL(2) of track data file (1) is as shown in FIG. 28, and cluster CL(0) of the newly created track data file (2) is as shown in FIG. 29. Sound unit SU(4) of cluster (2) of track data file (1) before the division, becomes sound unit SU(0) of cluster CL(0) in track data file (2). Similarly, sound unit SU (5) of the cluster (2) of track data file (1) before the division, becomes sound unit SU(1) of cluster CL(0) of track data file (2).

Further, the block encryption initial value IV of cluster CL (0) of track data file (2) is set equal to the last 8 bytes of sound unit SU (3) in cluster CL(2) of the track data file (1) shown in FIGS. 27(A) and 27(B). As mentioned above, in each cluster the block encryption initial value IV is arranged as the 8 bytes immediately before the first sound unit SU (0). Thus, each divided cluster contains its own encryption information, so that regardless of subsequent division, the data can be easily reproduced.

The content key data, part key data, and block key data of track data file (1) before the division are CK-1, PK-1, and BK-1. Further, the content key data, part key data, and block key data of track data file (1) after division are CK-1', PK-1', and BK-1. Also, the content key data, part key data, and block key data of track data file (2) are CK-2, PK-2, and BK-1.

Figure 30:
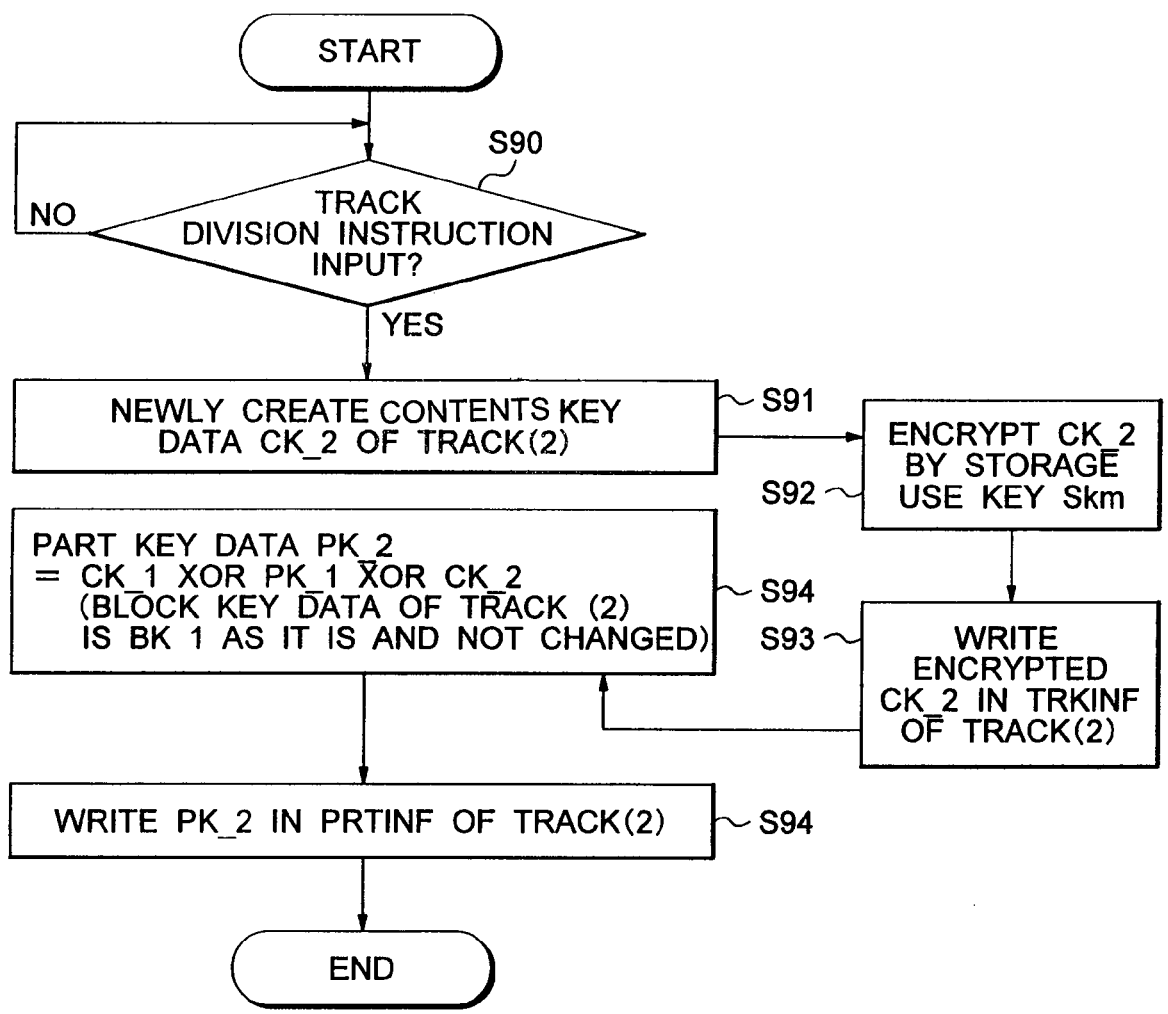
FIG. 30 is a flow chart for creating the track key data and the part key data of a new track data file at the divisional editing step by the editing module of the portable player shown in FIG. 2.

FIG. 30 is a flowchart explaining creation of the content key data and the part key data of new track data file (2) in editing module 44 of portable player 4. The new track data file (2) created by the division has the new content key data CK-2 separate from the track data file (1). By calculating the part key data PK-2 as shown below, the block key data BK-1 is the same as before the division. The process continues as follows.

Step S90: Editing module 44 waits until it receives a division instruction in which case control passes to step S91.

Step S91: Random number generation unit 60 generates a random number and creates the new content key data CK-2 according to the generated random number.

Step S92: Encrypting/decrypting unit 54 of portable storage device 3 encrypts the content key data CK-2 created at step S91 using the storage use key data Skm stored in storage unit 51.

Step S93: Editing module 44 writes the encrypted content key data CK-2 into the TRKINF in the corresponding track data file.

Step S94: Editing module 44 creates the part key data PK-2 of track data file (2) based on equation (15).

$$PK\text{-}2=CK\text{-}1 \text{ XOR } PK\text{-}1 \text{ XOR } CK\text{-}2 \tag{15}$$

This process makes the temporary key data (from equation (11)) for track data file (2) the same as the temporary key data of track data file (1), and the cluster key data created (from equation (12)) the same as the block key BK-1 before the division. For this reason, it is not necessary to encrypt the sound units SUs in the track data file (2) again using the new block key data.

Step S95: Editing module 44 writes the part key data PK-2 created at step S94 into PRTINF in the corresponding track data file.

Thus, even when the new content key data CK-2 is the same as the content key data of the newly created track data file (2) the part key data PK-2 created based on equation (15) allows the temporary key data to be made the same as the temporary key data before the division. As a result, the block key data is also the same as before the division. Therefore, it is not necessary to encrypt the sound units SUs in track data file (2) again using the new cluster key data. Similarly, the part key data PK-1' of track data file (1) after division is determined according to the content key data CK-1, so as not to change the block key data BK-1. As a result, it is not necessary to encrypt the sound units SUs in track data file (1) after division again by using new block key data. This allows the divisional editing of a track data file while avoiding a great increase in the amount of processing. Although the above description relates only to the track data files $101_0$ to $101_3$, editing module 44 rewrites the reproduction management file in a corresponding manner.

Figure 31:
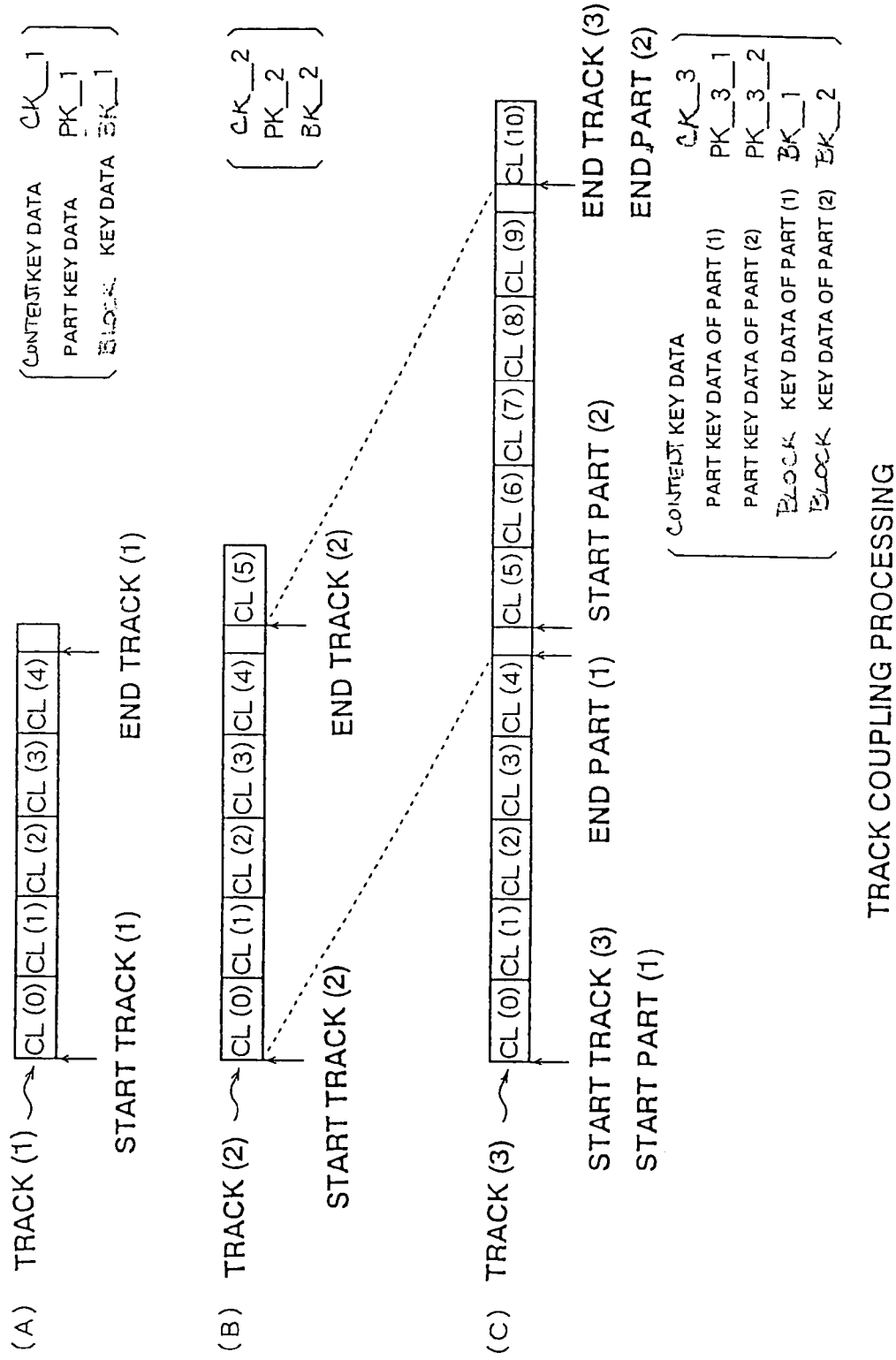
FIG. 31 explains the coupled editing of track data files by the editing module of the portable player shown in FIG. 2.

FIG. 31 explains coupling (or merging) of two track data files by editing module 44 of portable player 4. For example, editing module 44 couples track data file (1) shown in FIG. 31(A) and track data file (2) shown in FIG. 31(B) to create track data file (3) shown in FIG. 31(C). By coupling, a new track data file (3) is created containing a part (1) comprised of track data file (1) prior to coupling and a part (2) comprised of track data file (2) prior to coupling.

Further, content key data CK-3 for track data file (3), part key data PK-3-1 for part (1) and part key data PK-3-2 for part (2) are newly created as will be explained in greater detail below. The newly created key data are set into TRKINF and PRTINF in track data file (3).

The clusters CL(0) and CL(4) of track data file (1) prior to coupling become the start cluster and end cluster of part (1) of track (3) after coupling. Further, the clusters CL(0) and CL(5) of track data file (2) prior to coupling become the start cluster and the end cluster of part (2) of track (3) after coupling.

Figure 32:
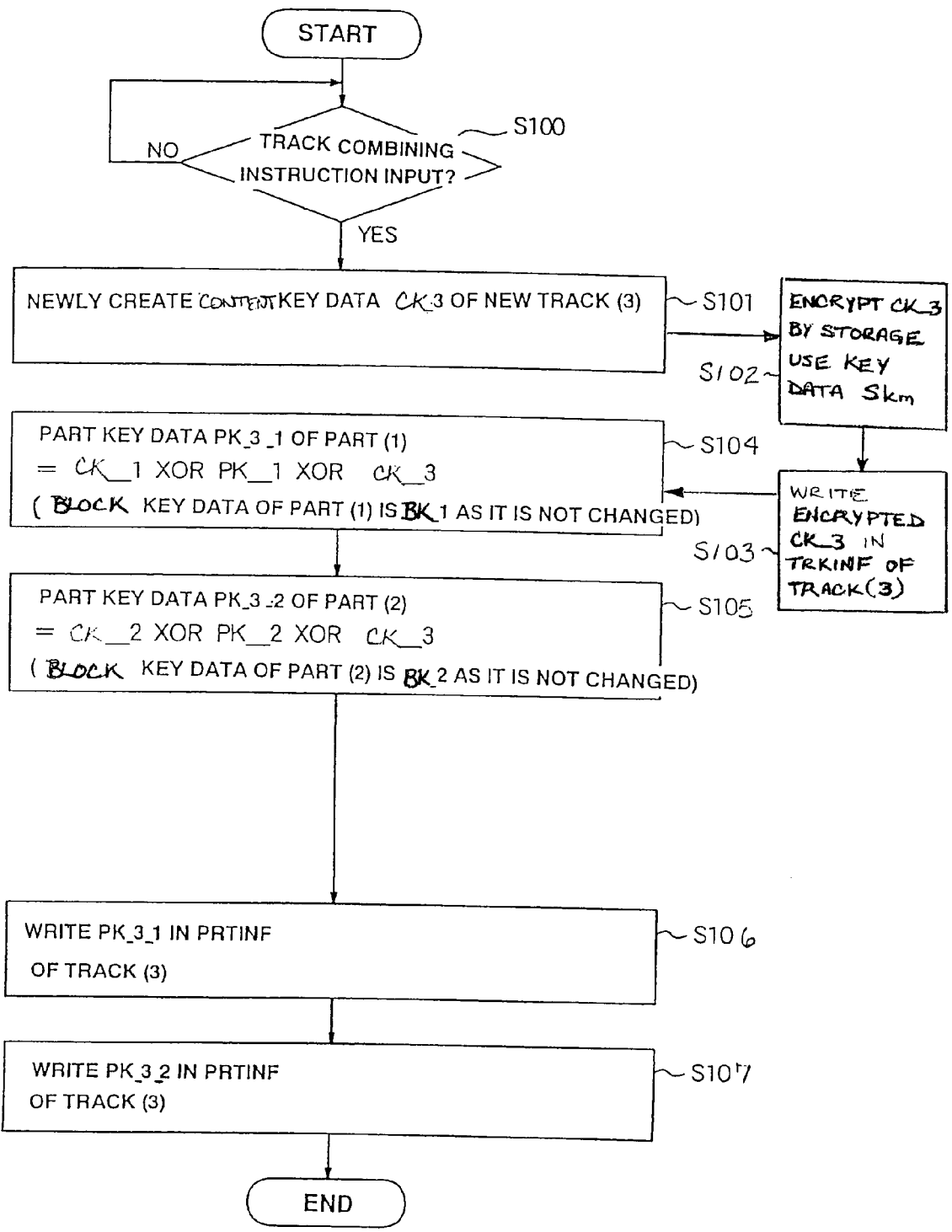
FIG. 32 is a flow chart for creating the part key data of parts (1) and (2) of track data file (3) newly created in the editing module of the portable player shown in FIG. 2.

FIG. 32 is a flowchart explaining creation of the part key data for parts (1) and (2) of the newly created track data file (3). In the following explanation track data file (1) uses content key data CK-1, part key data PK-1, and block key data BK-1, while track data file (2) uses content key data CK-2, part key data PK-2, and block key data BK-2. Track data file (3) acquires the new content key data CK-3 by calculating the part key data of parts (1) and (2) as will be described below. The block key data BK-1 and BK-2 remains the same as before coupling. The coupling process proceeds as follows.

Step S100: Editing module 44 waits until it receives a coupling instruction in which case control passes to step S101.

Step S101: Random number generation unit 60 generates a random number and creates the content key data CK-3 accordingly.

Step S102: Encrypting/decrypting unit 54 of portable storage device 3 encrypts the content key data CK-3 created at step S101 using the storage use key data Skm stored in storage unit 51.

Step S103: Editing module 44 writes the encrypted content key data CK-3 into TRKINF of track data file (3).

Step S104: Editing module 44 creates the part key data PK-3-1 for part (1) of track data file (3) based on equation (16).

$$PK\text{-}3\text{-}1 = CK\text{-}1 \text{ XOR } PK\text{-}1 \text{ XOR } CK\text{-}3 \qquad (16)$$

Temporary key data of part (1) (from equation (11)) is therefore the same as the temporary key data of the track data file (1) prior to coupling. As a result, the block key data of part (1) (from equation (12)) is also the same as the block key data BK-1 of the track data file (1) prior to coupling. Thus, it is not necessary to encrypt the sound units SUs of part (1) again using the new block key data.

Step S105: Editing module 44 creates the part key data PK-3-2 for part (2) of track data file (3) based on equation (17).

$$PK\text{-}3\text{-}2 = CK\text{-}2 \text{ XOR } PK\text{-}2 \text{ XOR } CK\text{-}3 \qquad (17)$$

Temporary key data of part (2) is therefore the same as the temporary key data of the track data file (2) As a result, the block key data of part (2) is also the same as the block key data BK-2 of track data file (2). For this reason, it is not necessary to encrypt the sound units SUs of part (2) again using the new block key data.

Step S106: Editing module 44 writes the part key data PK-3-1 created at step S104 in PRINTF of part (1) of track data file (3).

Step S107: Editing module 44 writes the part key data PK-3-2 created at step S105 in the PRINTF of part (2) of track data file (3).

Thus, even when the new content key data CK-3 is the same as the content key data of the newly created track data file (3), the part key data PK-3-1 and PK-3-2 created based on the equations (16) and (17) allows the temporary key data for each part to be made the same as for the similar data before the coupling. As a result, the block key data of the corresponding parts is also the same as BK-1 and BK-2 before the coupling. Therefore, it is not necessary to encrypt the sound units SUs in parts (1) and (2) again, using the new block key data. For this reason, the great increase in the amount of processing which normally accompanies coupled editing is avoided. Further, although the above description only relates to the track data files $101_0$ to $101_3$, editing module 44 correspondingly rewrites the reproduction management file 100.

The present invention is not limited to the above embodiments. For example, the above embodiments have the number of bytes (160 bytes) of the sound units SUs a whole multiple of the number of bytes (8 bytes) of the cipher block (the unit of encryption in the CBC mode). But the present invention, can be adjusted for when it is not a whole multiple by inserting padding to adjust the data length of the sound unit SU.

Further, the case was shown of first outputting the random number $R_{ms}$ created at portable storage device 3 to portable player 4 when mutual identification processing is performed as shown in FIG. 22. But it is also possible to first output a random number created at portable player 4 to portable storage device 3.

Further, the case where 32 sets of the identification key data and master key data were stored in storage units 51 and 61 was shown, but there may be any number of these sets as long as it is 2 or more.

Further, the case where the identification key data $IK_0$ to $IK_{31}$ were created from the master key data $MK_0$ to $MK_{31}$ in portable player 4 was given. But it is also possible to store the identification key data $IK_0$ to $IK_{31}$ in portable player 4 in the same way as that for portable storage device 3 and select the identification key data according to the random number $R_j$.

Further, as shown in FIG. 21, the case where the identification key data $IK_j$ and the master key data $MK_j$ are selected in portable storage device 3 and portable player 4 by using the random number $R_j$ created at portable player 4 was exemplified. But it is also possible to use a random number created at portable storage device 3 or to use random numbers generated in both portable storage device 3 and portable player 4.

Further, the above embodiments show the case where the identification key data $IK_j$ and the master key data $MK_j$ were selected in portable storage device 3 and portable player 4 based on the random number $R_j$. But according to the present invention, it is also possible to input the 5-bit key selection instruction data to portable storage device 3 and portable player 4 from the outside and select the identification key data $IK_j$ and the master key data $MK_j$ corresponding to each other indicated by the related key selection instruction data at portable storage device 3 and portable player 4.

Further, an example was given of data containing audio data as the track data, but the present invention can also be applied where track data containing moving picture data, stationary image data, document data, program data, and other types of data are stored in flash memory 34.

As explained above, according to the data processing apparatus and the data processing system of the present invention and the method for the same, even in the case where the first key data is changed after encrypting the track data by using the third key data and storing the same in the storage device, the third key data is not changed, so it becomes unnecessary to decrypt and re-encrypt the track data. For this reason, the amount of processing required when the first key data is changed is greatly reduced.

It will thus be seen that the objects set forth above, among those made apparent from the preceding description, are efficiently attained and, because certain changes may be made in carrying out the above method and in the construction(s) set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therein.

What is claimed is:

1. An audio/video data processing apparatus comprising:
    processing means for compressing audio/video data into a plurality of compression blocks, each compression block having a first data length, a predetermined number of compression blocks forming a track data file including key data;
    encrypting means for separating each compression block into a plurality of units and for encrypting each unit as an encryption block having a second data length smaller than the first data length, the key data including initial values for decrypting each encryption block
    wherein the first data length is a data length of an integer multiple greater than one of the second data length;
    storage means for storing the encryption blocks;
    editing means for one of (a) dividing one track data file into two edited track data files and (b) combining two track data files into one edited track data file, said editing means creating new key data for the edited track data file(s) such that re-encryption of encryption blocks is not performed for the edited track data file(s); and
    control means for writing the encryption blocks in said storage means so that data positioned in a same encryption block is also positioned in a same compression block, said control means reading the encryption blocks from said storage means in units of compression blocks.

2. The audio/video data processing apparatus as set forth in claim 1, wherein said control means inserts data into said compression block to adjust the data length in the compression block so that the length of said compression block becomes a whole multiple of the second data length of said encryption block.

3. The audio/video data processing apparatus as set forth in claim 1, wherein said encrypting means performs encryption processing using the encryption block to be encrypted and a cipher text obtained from the encryption of the encryption block immediately prior to the encryption block to be encrypted.

4. The audio/video data processing apparatus as set forth in claim 3, wherein said control means manages the encrypted data stored in said storage means using a cluster containing one or more compression blocks and the initial values initially used when encrypting an encryption block in one of said compression blocks.

5. The audio/video data processing apparatus as set forth in claim 4, wherein said control means stores said one or more compression blocks at consecutive addresses of said storage means in the order of encryption, stores said one or more encryption blocks in said compression blocks at consecutive addresses of said storage means in the order of encryption, and stores said initial values at an address immediately prior to the address of at which the first encryption block in the cluster is stored.

6. The audio/video data processing apparatus as set forth in claim 1, wherein said control means outputs said data read out in compression block units to said processing means.

7. A data processing system for inputting and outputting data while performing mutual identification between a storage apparatus and an audio/video data processing apparatus, said storage apparatus comprising:
    first mutual identification processing means for performing processing for mutual identification with said data processing apparatus;
    storage means for storing said data; and
    first control means for allowing the input and output of data between said data processing apparatus and said storage means when said data processing apparatus is recognized to be a legitimate party by the processing for mutual identification;
    said audio/video data processing apparatus comprising:
    second mutual identification processing means for performing processing for mutual identification with said storage apparatus;
    processing means for compressing audio/video data into a plurality of compression blocks, each compression block having a first data length, a predetermined number of compression blocks forming a track data file including key data;
    encrypting means for separating each compression block into a plurality of units and for encrypting each unit as an encryption block having a second data length smaller than the first data length, the key data including initial values for decrypting each encryption block
    wherein the first data length is a data length of an integer multiple greater than one of the second data length;
    editing means for one of (a) dividing one track data file into two edited track data files and (b) combining two track data files into one edited track data file, said editing means creating new key data for the edited track data file(s) such that re-encryption of encryption blocks is not performed for the edited track data file(s); and
    second control means for performing at least one of write processing and read processing when said data processing apparatus is recognized to be a legitimate party by the processing for mutual identification, for writing the encryption blocks in said storage means so that data positioned in one encryption block is also positioned in a same compression block during write processing, and for reading the encryption blocks from said storage means in units of compression blocks during read processing.

8. The data processing system as set forth in claim 7, wherein said second control means inserts data into said compression block to adjust the data length in the compression block so that the length of said compression block becomes a whole multiple of the second data length of said encryption block.

9. The data processing system as set forth in claim 7, wherein said encrypting means performs encryption processing using the encryption block to be encrypted and a cipher text obtained from the encryption of the encryption block immediately prior to the encryption block to be encrypted.

10. The data processing system as set forth in claim 9, wherein said second control means manages the encrypted data stored in said storage means using a cluster containing one or more compression blocks and the initial values initially used when encrypting an encryption block in one of said compression blocks.

11. The data processing system as set forth in claim 10, wherein the second control means stores said one or more compression blocks at consecutive addresses of said storage means in the order of encryption, stores said one or more encryption blocks in said compression blocks at consecutive addresses of said storage means in the order of encryption, and stores said initial values at an address immediately prior to the address of at which the first encryption block in the cluster is stored.

12. An audio/video data processing method, comprising the steps of:
  compressing audio/video data into a plurality of compression blocks, each compression block having a first data length, a predetermined number of compression blocks forming a track data file including key data;
  separating each compression block into a plurality of units and encrypting each unit as an encryption block having a second data length smaller than the first data length, the key data including initial values for decrypting each encryption block
  wherein the first data length is a data length of an integer multiple greater than one of the second data length;
  editing by one of (a) dividing one track data file into two edited track data files and (b) combining two track data files into one edited track data file, and creating new key data for the edited track data file(s) such that re-encryption of encryption blocks is not performed for the edited track data file(s);
  writing the encryption blocks to a storage means so that data positioned in one encryption block are also positioned in a same compression block; and
  reading the encryption blocks from the storage means in units of compression blocks.

13. The audio/video data processing method as set forth in claim 12, further comprising the step of inserting data into said compression block to adjust the data length in the compression block so that the length of said compression block becomes a whole multiple of the second data length of said encryption block.

14. The audio/video data processing method as set forth in claim 12, further comprising the step of using the encryption block to be encrypted and a cipher text obtained from the encryption of the encryption block immediately prior to the encryption block to be encrypted to perform encryption processing.

15. The audio/video data processing method as set forth in claim 14, further comprising the step of managing the encrypted data stored in said storage means using a cluster containing one or more compression blocks and the initial values initially used when encrypting an encryption block in one of said compression blocks.

16. The audio/video data processing method as set forth in claim 15, further comprising the steps of:
  storing said one or more compression blocks at consecutive addresses of said storage means in the order of encryption;
  storing said one or more encryption blocks in said compression blocks at consecutive addresses of said storage means in the order of encryption; and
  storing said initial values at an address immediately prior to the address of at which the first encryption block in the cluster is stored.

17. An audio/video data processing apparatus comprising:
  processing means for compressing audio/video data into a plurality of compression blocks, each compression block having a first data length, wherein the first data length is a data length which is able to replay said audio/video data, a predetermined number of compression blocks forming a track data file including key data;
  encrypting means for separating each compression block into a plurality of units and for encrypting each unit as an encryption block having a second data length, the key data including initial values for decrypting each encryption block
  wherein the first data length is a data length of an integer multiple greater than one of the second data length;
  storage means for storing the encryption blocks;
  editing means for one of (a) dividing one track data file into two edited track data files and (b) combining two track data files into one edited track data file, said editing means creating new key data for the edited track data file(s) such that re-encryption of encryption blocks is not performed for the edited track data file(s); and
  control means for writing the encryption blocks in said storage means so that data positioned in a same encryption block is also positioned in a same compression block, said control means reading the encryption blocks from said storage means in units of compression blocks.

18. A data processing system for inputting and outputting data while performing mutual identification between a storage apparatus and an audio/video data processing apparatus, said storage apparatus comprising:
  first mutual identification processing means for performing processing for mutual identification with said data processing apparatus;
  storage means for storing said data; and
  first control means for allowing the input and output of data between said data processing apparatus and said storage means when said data processing apparatus is recognized to be a legitimate party by the processing for mutual identification;
  said audio/video data processing apparatus comprising:
  second mutual identification processing means for performing processing for mutual identification with said storage apparatus;
  processing means for compressing audio/video data its into a plurality of compression blocks, each compression block having a first data length, wherein the first data length is a data length to replay said audio/video data, a predetermined number of compression blocks forming a track data file including key data;

encrypting means for separating each compression block into a plurality of units and for encrypting each unit as an encryption block having a second data length, the key data including initial values for decrypting each encryption block wherein the first data length is a data length of an integer multiple greater than one of the second data length;

editing means for one of (a) dividing one track data file, into two edited track data files and (b) combining two track data files into one edited track data file, said editing means creating new key data for the edited track data file(s) such that re-encryption of encryption blocks is not performed for the edited track data file(s); and second control means for performing at least one of write processing and read processing when said data processing apparatus is recognized to be a legitimate party by the processing for mutual identification, for writing the encryption blocks in said storage means so that data positioned in one encryption block is also positioned in a same compression block during write processing, and for reading the encryption blocks from said storage means in units of compression blocks during read processing.

19. An audio/video data processing method, comprising the steps of:

compressing audio/video data into a plurality of compression blocks, each compression block having a first data length, wherein the first data length is a data length for replay of said audio/video data, a predetermined number of compression blocks forming a track data file including key data;

separating each compression block into a plurality of units and encrypting each unit as an encryption block having a second data length, the key data including initial values for decrypting each encryption block;

wherein the first data length is a data length of an integer multiple greater than one of the second data length;

editing by one of (a) dividing one track data file into two edited track data files and (b) combining two track data files into one edited track data file, and creating new key data for the edited track data file(s) such that re-encryption of encryption blocks is not performed for the edited track data file(s);

writing the encryption blocks to a storage means so that data positioned in one encryption block are also positioned in a same compression block; and reading the encryption blocks from the storage means in units of compression blocks.

* * * * *